US009822876B2

(12) United States Patent
Tsuji et al.

(10) Patent No.: US 9,822,876 B2
(45) Date of Patent: Nov. 21, 2017

(54) AXIAL PISTON DEVICE

(71) Applicant: KANZAKI KOKYUKOKI MFG. CO., LTD., Amagasaki-shi (JP)

(72) Inventors: Tomoyuki Tsuji, Amagasaki (JP); Tooru Oota, Amagasaki (JP)

(73) Assignee: KANZAKI KOKYUKOKI MFG. CO., LTD., Hyogo (JP)

( * ) Notice: Subject to any disclaimer, the term of this patent is extended or adjusted under 35 U.S.C. 154(b) by 410 days.

(21) Appl. No.: 14/478,441

(22) Filed: Sep. 5, 2014

(65) Prior Publication Data

US 2015/0068395 A1 Mar. 12, 2015

(30) Foreign Application Priority Data

Sep. 9, 2013 (JP) .................. 2013-185824
Oct. 24, 2013 (JP) .................. 2013-221223

(51) Int. Cl.
*F04B 53/18* (2006.01)
*F16J 1/08* (2006.01)
*F16J 1/09* (2006.01)
*F01B 3/00* (2006.01)
*F01B 3/02* (2006.01)
*B60T 1/06* (2006.01)
*F04B 1/20* (2006.01)

(52) U.S. Cl.
CPC ............ *F16J 1/08* (2013.01); *B60T 1/062* (2013.01); *F01B 3/0032* (2013.01); *F01B 3/02* (2013.01); *F04B 1/20* (2013.01); *F04B 53/18* (2013.01); *F16J 1/09* (2013.01)

(58) Field of Classification Search
CPC ............ F16H 57/0424; F16H 54/0447; F16H 57/0447; F04B 53/18
See application file for complete search history.

(56) References Cited

U.S. PATENT DOCUMENTS

| 453,852 | A | * | 6/1891 | Berry | ............ | F04B 7/06 |
| | | | | | | 91/476 |
| 3,304,885 | A | * | 2/1967 | Orth | ............ | F01B 3/0032 |
| | | | | | | 60/456 |
| 3,360,933 | A | * | 1/1968 | Swanson | ............ | F16H 61/40 |
| | | | | | | 137/565.35 |
| 8,118,567 | B2 | * | 2/2012 | Mori | ............ | F04B 1/2078 |
| | | | | | | 29/888.02 |

FOREIGN PATENT DOCUMENTS

JP 2001-059561 3/2001

\* cited by examiner

*Primary Examiner* — F. Daniel Lopez
(74) *Attorney, Agent, or Firm* — Sterne, Kessler, Goldstein & Fox P.L.L.C.

(57) ABSTRACT

A housing of an axial piston device is provided with a drain port for discharging the retained oil to the outside and a supply oil passage for guiding lubricating oil, which has been supplied from an oil source, toward a first hydraulic axial piston member. The drain port is arranged so as to bring about such a retained-oil level that a second hydraulic axial piston member, which is disposed below the first hydraulic axial piston member, is partially or entirely immersed in the retained oil while the first hydraulic axial piston member is not immersed in the retained oil.

10 Claims, 21 Drawing Sheets

AXIAL PISTON DEVICE

BACKGROUND OF THE INVENTION

Field of the Invention

The present invention relates to an axial piston device in which a plurality of axial piston members such as a hydraulic pump and a hydraulic motor are accommodated in an oil-retainable housing.

Related Art

In axial piston devices in which a plurality of axial piston members are accommodated in an oil-retainable housing, lubrication of the plurality of axial piston members is generally carried out by immersing the plurality of axial piston members in oil retained in the housing, but this configuration is problematic in that the axial piston members all receive rotational resistance caused by the retained oil.

In order to address this problem, it is proposed that in a hydrostatic transmission in which a hydraulic pump and a hydraulic motor are both accommodated in an oil-retainable housing, with one of the hydraulic pump and the hydraulic motor being placed above the other, a drain port is provided in a place lower than the upper edge of the cylinder block of the hydraulic pump or the hydraulic motor, whichever is placed higher (see, for example, JP2001-059561A, hereinafter referred to as Patent Document 1).

Compared with the configuration in which the hydraulic pump and the hydraulic motor are completely immersed in retained oil, the hydrostatic transmission described in Patent Document 1 is effective in being capable of reducing rotational resistance to the hydraulic pump and the hydraulic motor resulting from retained oil while lubricating the hydraulic pump and the hydraulic motor.

However, in the configuration described in Patent Document 1, the hydraulic motor, which is the lower of the hydraulic pump and the hydraulic motor, is completely immersed in retained oil, and a part of the hydraulic pump placed higher is also immersed in retained oil.

Therefore, there is still room for improvement from the viewpoint of reducing rotational resistance to the hydraulic pump and the hydraulic motor resulting from retained oil.

BRIEF SUMMARY OF THE INVENTION

The present invention has been conceived in view of the above-described conventional art, and an object of the present invention is, in an axial piston device in which first and second axial piston members are accommodated in an oil-retainable housing, to reduce as much as possible rotational resistance to the first and second axial piston members as a whole resulting from the retained oil while effectively lubricating the first and second axial piston members.

In order to achieve the object, the present invention provides an axial piston device including a housing capable of retaining oil, a first rotational, shaft supported by the housing in a rotatable manner around an axial line, a second rotational shaft placed below the first rotational shaft and supported by the housing in a rotatable manner around an axial line, a first hydraulic axial piston member accommodated in the housing while being supported by the first rotational shaft in a relatively non-rotatable manner with respect thereto, and a second hydraulic axial piston member accommodated in the housing while being supported by the second rotational shaft in a relatively non-rotatable manner with respect thereto, wherein the housing is provided with a drain port for discharging the retained oil to the outside and a supply oil passage for guiding lubricating oil, which has been supplied from an oil source, toward the first hydraulic axial piston member, and wherein the drain port is arranged so as to bring about such a retained-oil level that the second hydraulic axial piston member is partially or entirely immersed in the retained oil while the first hydraulic axial piston member is not immersed in the retained oil.

Since the housing that accommodates the first and second hydraulic axial piston members is provided with the drain port that discharges the retained oil to the outside and is arranged so as to bring about such the retained-oil level that the second hydraulic axial piston member is partially or entirely immersed in the retained oil while the first hydraulic axial piston member is not immersed in the retained oil, and the supply oil passage that guides lubricating oil, which has been supplied from an oil source, toward the first hydraulic axial piston member, the axial piston device according to the present invention makes it possible to reduce as much as possible rotational resistance to the first and second axial piston members as a whole resulting from the retained oil while effectively lubricating the first and second axial piston members.

The housing may include a housing body provided with an opening into which the first and second hydraulic axial piston members can be inserted and a port block removably connected to the housing body so as to block the opening.

The housing body may include a peripheral wall that extends in an axial direction of the second rotational shaft and defines the opening on a first end side in the axial direction of the second rotational shaft, and an end wall that closes the peripheral wall on a second end side in the axial direction of the second rotational shaft and supports the second rotational shaft ill a rotatable manner around the axial line by working together with the port block.

The drain port may be arranged in the end wall so as to overlap the second hydraulic axial piston member as viewed from the front along the second rotational shaft.

Alternatively, the drain port may be arranged in the peripheral wall so as to overlap the second hydraulic axial piston member as viewed from the side perpendicular to the second rotational shaft.

In one embodiment, the first rotational shaft functions as a pump shaft that is operatively connected to a driving source, and the second rotational shaft functions as a motor shaft that outputs rotative power. The first hydraulic axial piston member functioning as a hydraulic pump and the second hydraulic axial piston member functioning as a hydraulic motor, at least one of which is a variable-volume type, are fluidly connected by a pair of hydraulic oil lines so as to form a closed circuit.

In this embodiment, the supply oil passage may preferably receive, as the lubricating oil, a part of oil in a charge line for replenishing the pair of hydraulic oil lines with hydraulic oil.

For example, the port block may be formed with a charge oil passage having a first end fluidly connected to an oil source and a second end fluidly connected to the pair of hydraulic oil lines via a pair of check valves.

In this case, the supply oil passage may have a first end side that is fluidly connected to the charge oil passage on the more upstream side in the charge oil flow direction than the pair of check valves are, and a second end side that opens toward the first axial piston member.

The first hydraulic axial piston member may include a cylinder block that is supported by the first rotational shaft in a relatively non-rotatable manner with respect thereto and has a plurality of cylinder holes disposed around the axial line of the first rotational shaft, and a plurality of pistons that are accommodated in the plurality of cylinder holes in a reciprocating manner, and may be configured so that the free ends of the plurality of pistons are directly or indirectly engaged with a first-hydraulic-axial-piston-device swash plate, which is provided in the axial piston device, so as to define a volume of the first hydraulic axial piston member.

In this case, the supply oil passage may include a port-block-side supply oil passage formed in the port block, a housing-body-side supply oil passage formed in the housing body, and a rotational-shaft-side supply oil passage formed in the first rotational shaft.

The port-block-side supply oil passage may have a first end that is fluidly connected to the charge oil passage on the more upstream side in the charge oil flow direction than the pair of check valves are, and a second end that opens to a portion of the port block that is in contact with the peripheral wall of the housing body.

The housing-body-side supply oil passage has a first end that opens to a portion of the housing body that is in contact with the port block so as to be fluidly connected to the second end of the port-block-side supply oil passage, and a second end that opens to a portion of the end wall where the first rotational shaft is in slide-contact with.

The rotational-shaft-side supply oil passage includes an receiving oil hole that has a first end opening to the external surface of the first rotational shaft so as to be fluidly connected to the second end of the housing-body-side lubricating oil passage, an axial oil hole that is fluidly connected to the receiving oil hole and extends in the axial direction, and a first lubricating oil hole that has a first end fluidly connected to the axial oil hole and a second end opening to the external surface of the first rotational shaft near the engagement portion between the free ends of the plurality of pistons and the swash plate.

The supply oil passage may further include a second lubricating oil hole that has a first end fluidly connected to the axial oil hole and a second end opening toward a bearing member attached to the port block for supporting a first end side in the axial direction of the first rotational shaft in a rotatable manner around the axial line, and a third lubricating oil hole that has a first end fluidly connected to the housing-body-side supply oil passage or the rotational-shaft-side supply oil passage and a second end opening toward a bearing member attached to the end wall for supporting a second end side in the axial direction of the first rotational shaft in a rotatable manner around the axial line.

In a case where the swash plate includes a base body supported by the peripheral wall so as to be rotatable around a swinging axis perpendicular to the first rotational shaft, and a swash plate body supported by the base body and directly or indirectly engaged with the free ends of the plurality of pistons, the supply oil passage may preferably include a fourth lubricating oil hole that has a first end fluidly connected to the housing-body-side supply oil passage and a second end opening to a supporting hole formed in the peripheral wall for supporting the base body.

BRIEF DESCRIPTION OF THE DRAWINGS

The above, and other objects, features and advantages of the present invention will become apparent from the detailed description thereof in conjunction with the accompanying drawings therein.

DETAILED DESCRIPTION OF THE INVENTION

First Embodiment

Below, one embodiment of the axial piston device according to the present invention will now be described with reference to the attached drawings.

Figure 1:
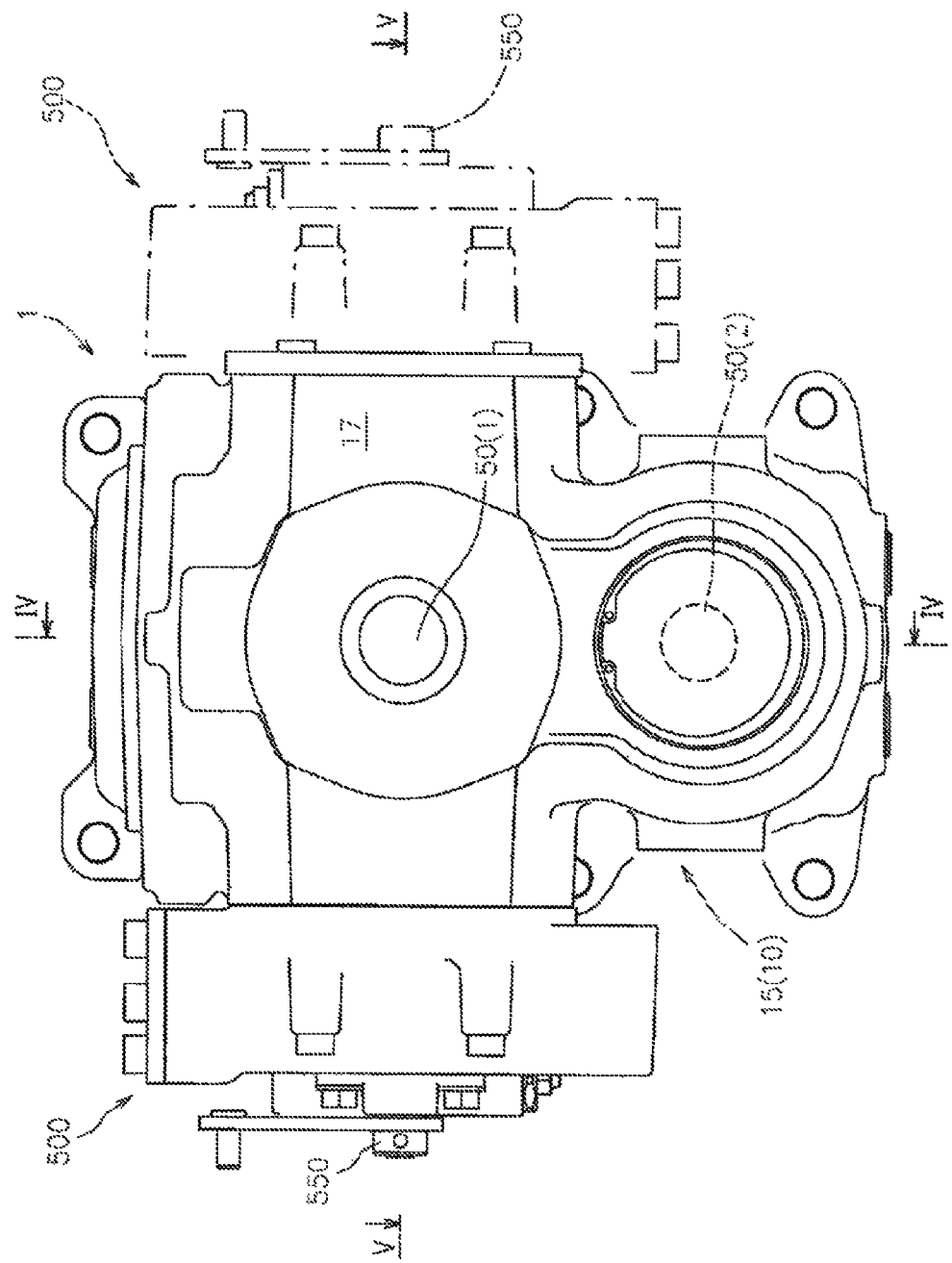
FIG. 1 is a schematic view of an axial piston device according to a first embodiment of the present invention.
Figure 2:
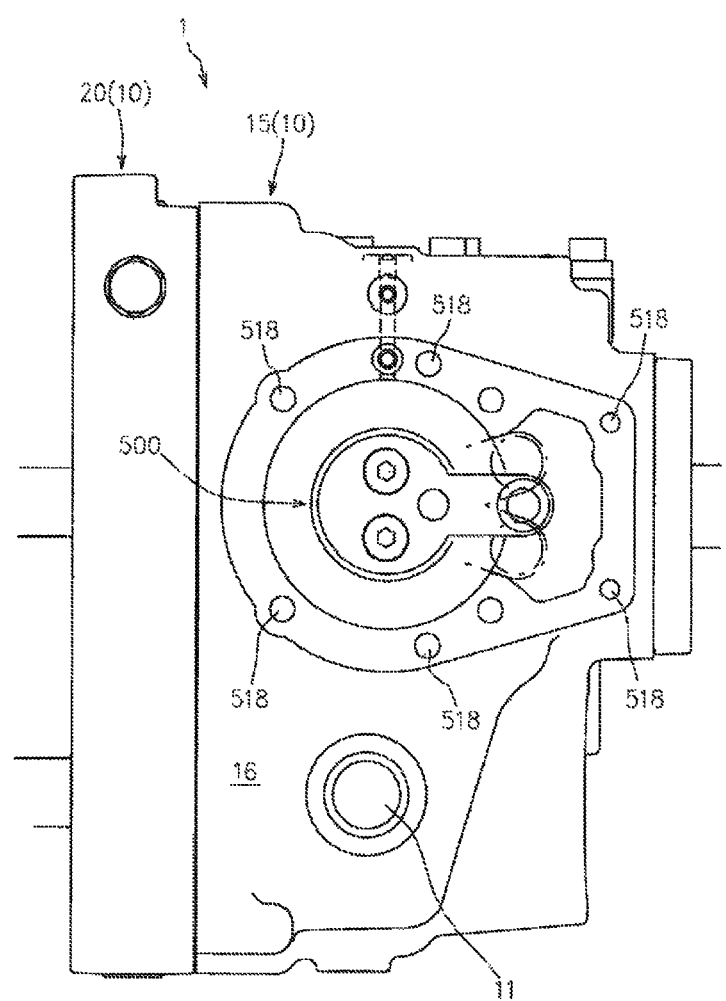
FIG. 2 is a left side view of the axial piston device shown in FIG. 1.
Figure 3:
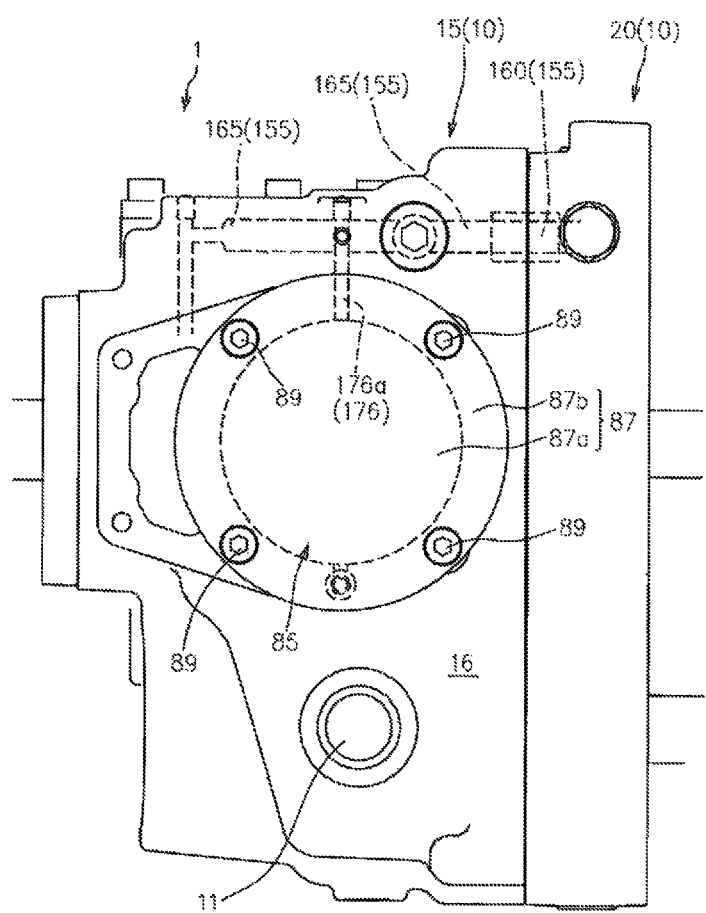
FIG. 3 is a right side view of the axial piston device shown in FIG. 1.

FIGS. 1 to 3 respectively show a front view, a left side view, and a right side view of an axial piston device 1 according to the present embodiment.

Figure 4:
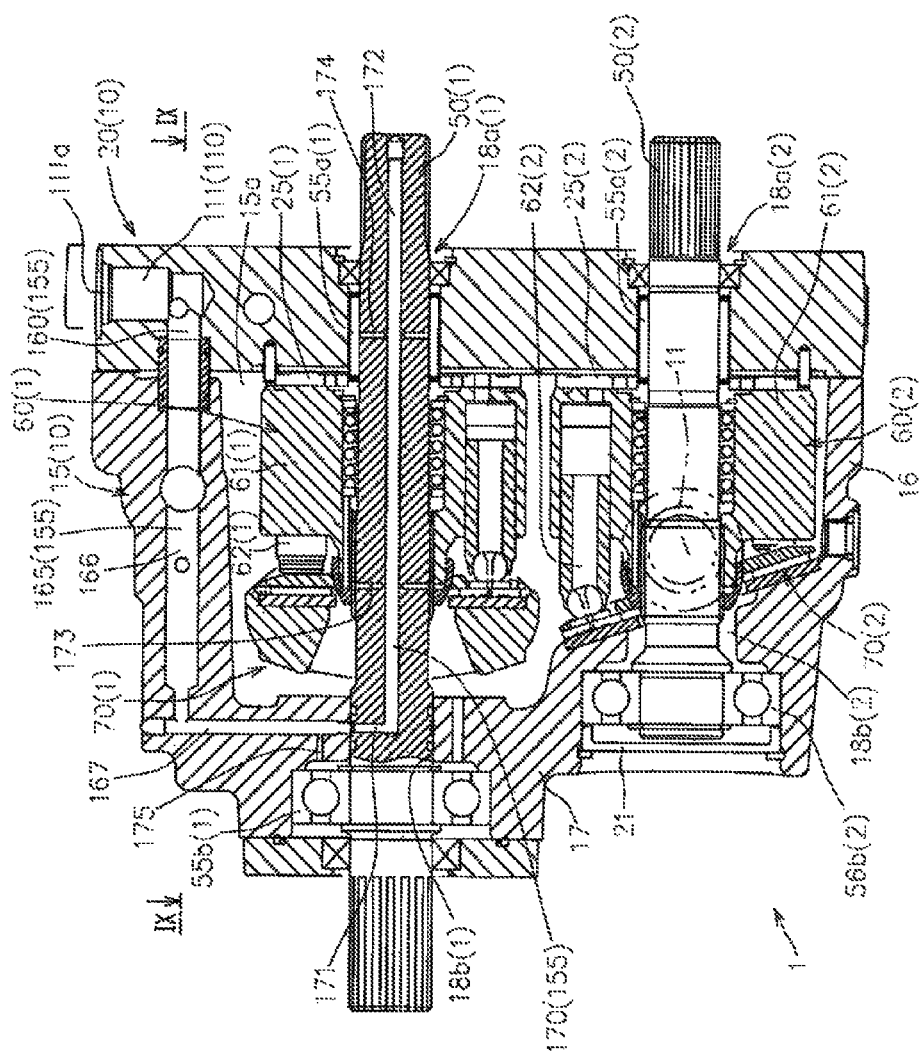
FIG. 4 is a cross-sectional view taken along the line IV-IV in FIG. 1.
Figure 5:
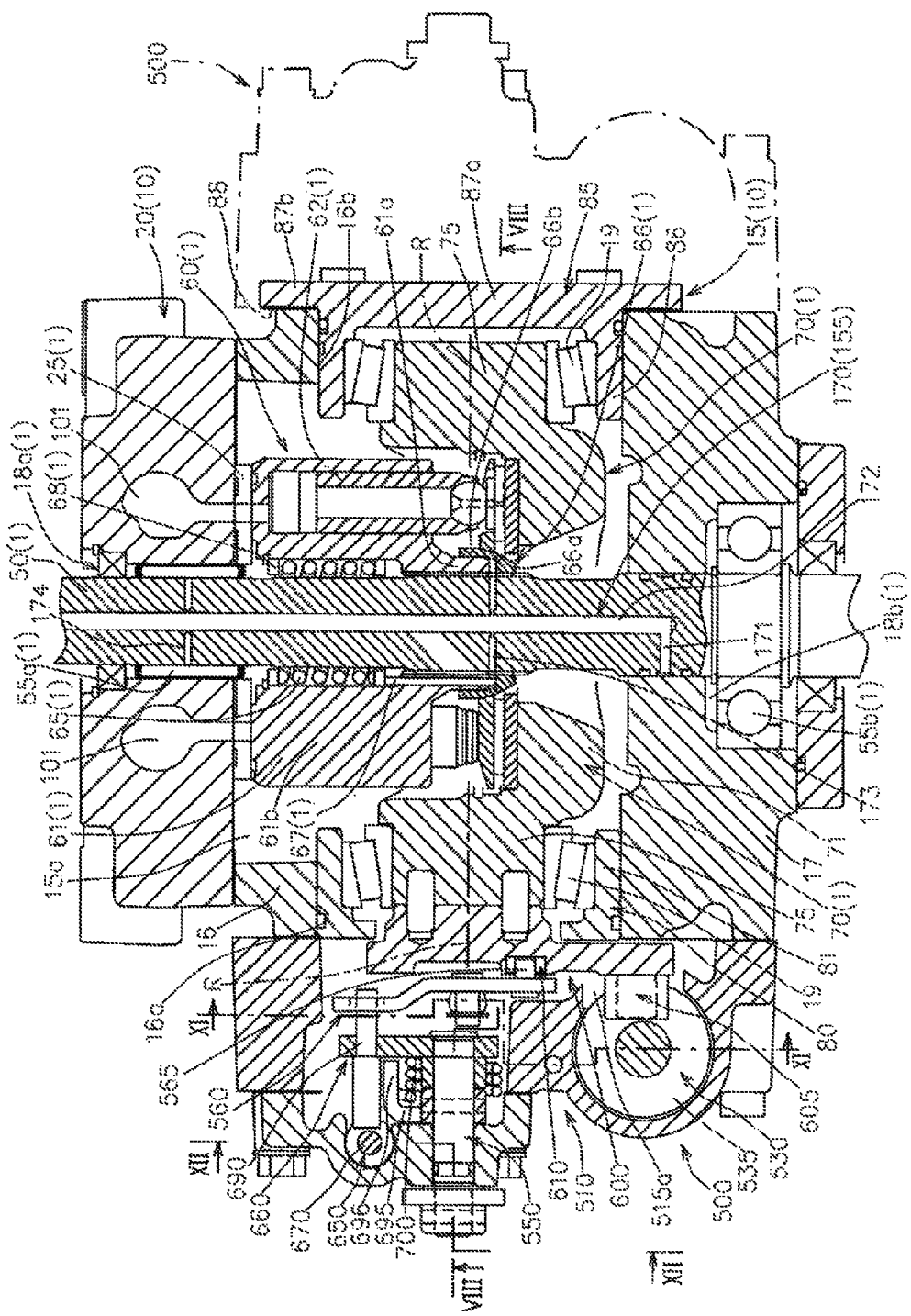
FIG. 5 is a cross-sectional view taken along the line V-V in FIG. 1.

Also, FIGS. 4 and 5 respectively show cross-sectional views taken along the lines IV-IV and V-V in FIG. 1.

Figure 6:
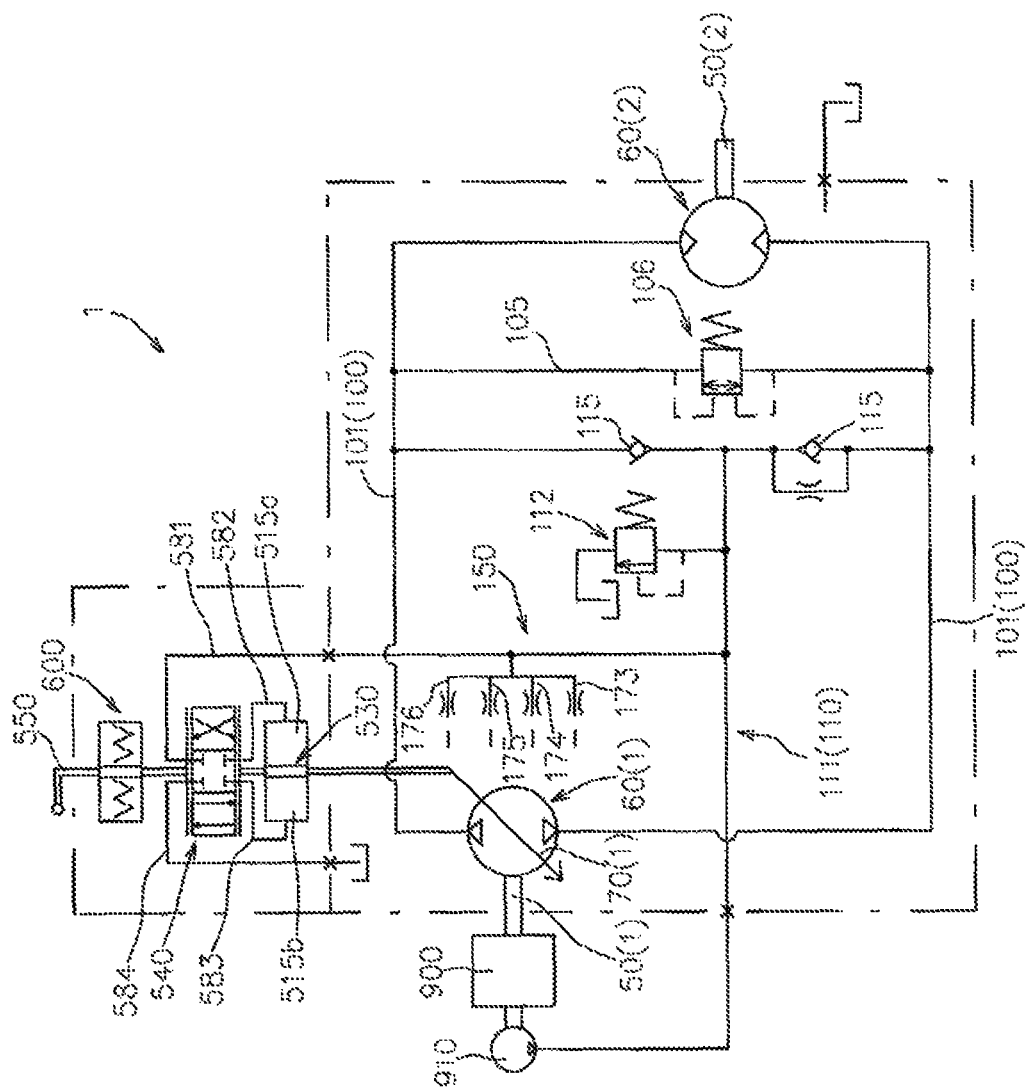
FIG. 6 is a hydraulic circuit diagram of the axial piston device.

Moreover, FIG. 6 shows a hydraulic circuit diagram of the axial piston device 1.

As shown in FIG. 4, the axial piston device 100 comprises a housing 10 capable of retaining oil; a first rotational shaft 50(1) supported by the housing 10 so as to be axially rotatable; a second rotational shaft 50(2) placed below the first rotational shaft 50(1) and supported by the housing 10 so as to be axially rotatable; a first hydraulic axial piston member 60(1) accommodated in the housing 10 while being supported by the first rotational shaft 50(1) so as not to be relatively rotatable with respect thereto; and a second hydraulic axial piston member 60(2) accommodated in the housing 10 while being supported by the second rotational shaft 50(2) so as not to be relatively rotatable with respect thereto.

The axial piston device 1 according to the present embodiment is configured to function as a hydrostatic transmission (HST).

That is, one of the first rotational shaft 50(1) and the second rotational shaft 50(2) functions as a pump shaft that is operatively connected to a driving source 900, and the other functions as a motor shaft that outputs rotative power.

The first and second axial piston members 60(1) and 60(2) respectively supported by the first and second rotational shafts 50(1) and 50(2), at least one of which is a variable-volume type, are fluidly connected by a pair of hydraulic oil lines 100 so as to form a closed circuit.

In the configuration shown in the drawings, the first and second rotational shafts 50(1) and 50(2) are configured to function as a pump shaft and a motor shaft, respectively, and the first and second axial piston members 60(1) and 60(2) are configured to function as a hydraulic pump and a hydraulic motor, respectively.

As shown in FIGS. 4 to 6, the axial piston device 1 further comprises a first swash plate 70(1) that defines the volume of the first axial piston member 60(1) and a second swash plate 70(2) that defines the volume of the second axial piston member 60(2).

In the present embodiment, as shown in FIG. 5, the first swash plate 70(1) is a movable swash plate capable of tilting around a swinging axis R based on external operation, and the volume of the first axial piston member 60(1) that functions as a hydraulic pump is variable.

In the present embodiment, the following configuration is adopted in order to reduce as much as possible rotational resistance to the axial piston members 60(1) and 60(2) as a whole while effectively lubricating the first and second axial piston members 60(1) and 60(2).

That is, the second axial piston member 60(2), which is placed below, is lubricated by oil retained in the housing 10.

Specifically, as shown in FIGS. 2 to 4, a drain port 11 for discharging the retained oil to the outside is disposed in a place that brings about such a retained-oil level that the first axial piston member 60(1) is not immersed in the retained oil and the second axial piston member 60(2) is partially or entirely immersed in the retained oil, and this prevents or reduces rotational resistance to the first axial piston member 60(1) resulting from the retained oil.

In the present embodiment, as shown in FIG. 4, the drain port 11 is disposed in a place where it overlaps the second axial piston member 60(2) as viewed from the side.

Specifically, as shown in, for example, FIGS. 4 and 5, the housing 10 comprises a housing body 15 provided with an opening 15a into which the first and second axial piston members 60(1) and 60(2) can be inserted and a port block 20 removably connected to the housing body 15 so as to block the opening 15a.

As shown in, for example, FIGS. 4 and 5, the housing body 15 comprises a peripheral wall 16 that extends in the axial direction of the second rotational shaft 50(2) and defines the opening 15a on the first end side in the axial direction of the second rotational shaft 50(2) and an end wall 17 that blocks the peripheral wall 16 on the second end side in the axial direction of the second rotational shaft 50(2) and supports the second rotational shaft 50(2) so as to be axially rotatable by working together with the port block 20. The term "second end side" as used herein refers to the side opposite to the "first end side".

In this configuration, as shown in FIGS. 2 to 4, the drain port 11 in the present embodiment is provided in the peripheral wall 16 so as to overlap the second axial piston member 60(2) as viewed from the side perpendicular to the second rotational shaft 50(2).

In the embodiment shown in the drawings, the drain port 11 is disposed at substantially the same height as the second rotational shaft 50(2).

On the other hand, the first axial piston member 60(1), which is placed above, is configured to be lubricated via a supply line 150, the first end side of which is fluidly connected to an oil source as shown in FIG. 6.

Thus, in the present embodiment, the drain port 11 is provided in a vertical position that brings about such a retained-oil level that the second axial piston member 60(2) is partially or entirely immersed in the retained oil while the first axial piston member 60(1) is not immersed in the retained oil, and, on the other hand, lubrication of the first axial piston member 60(1) is performed via the supply line 150. Thereby, rotational resistance by the retained oil to the first axial piston member 60(1) is prevented or reduced, while effectively ensuring lubrication of the first and second axial piston members 60(1) and 60(2).

In the present embodiment, as described above, the drain port 11 is provided in the peripheral wall 16 of the housing body 15, but, as a matter of course, the present invention is not limited to this embodiment.

For example, it is also possible to provide the drain port 11 in the end wall 17 of the housing body 15.

Figure 7:
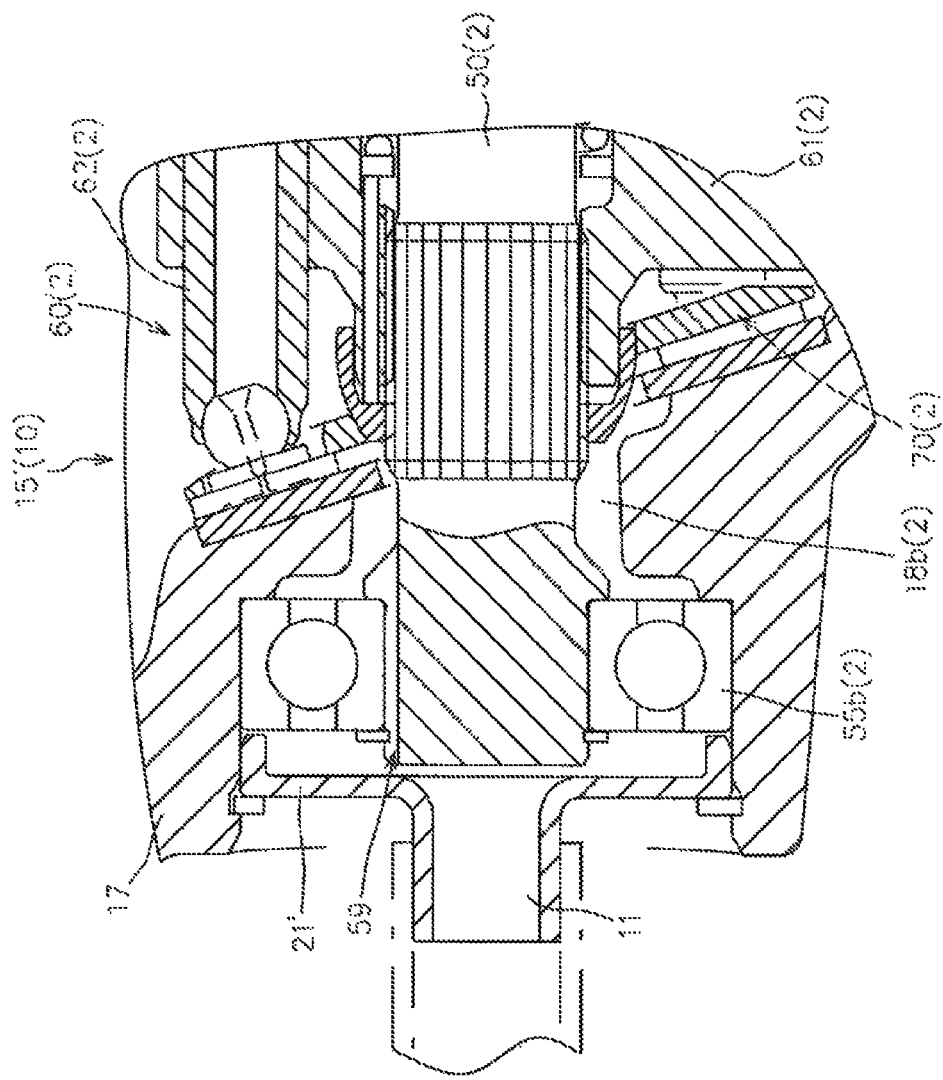
FIG. 7 is a partially enlarged cross-sectional view of an axial piston device according to a modification of the first embodiment.

FIG. 7 shows a partially enlarged cross-sectional view of a modification in which the drain port 11 is provided in the end wall 17.

Specifically, as shown in FIG. 4, the first rotational shaft 50(1) has a first end side that is supported via a bearing member 55a(1) by a first-end-side first bearing hole 18a(1) formed in the housing 10 (in the port block 20 in the present embodiment), and a second end side that is supported via a bearing member 55b(1) by a second-end-side first bearing hole 18b(1) formed in the housing 10 (in the end wall 17 in the present embodiment).

Likewise, the second rotational shaft 50(2) has a first end side that is supported via a bearing member 55a(2) by a first-end-side second bearing hole 18a(2) formed in the housing 10 (in the port block 20 in the present embodiment), and a second end side that is supported via a bearing member 55b(2) by a second-end-side second bearing hole 18b(2) formed in the housing 10 (in the end wall 17 in the present embodiment).

The second bearing hole 18b(2) of the end wall 17 is blocked by a cap member 21 removably attached to the end wall 17.

In comparison to the axial piston device 1 according to the present embodiment, the modification shown in FIG. 7 has a housing body 15' that is free of the drain port 11 in place of the housing body 15 and a cap member 21' that is provided with the drain port 11 in place of the cap member 21.

According to the modification, the retained oil in the housing 10 is discharged from the drain port 11 through the second axial piston member 60(2), the second swash plate 70(2), and the bearing member 55b(2) supporting the second end side of the second rotational shaft 50(2).

In the modification shown in FIG. 7, the flow channel of the retained oil to the drain port 11 is in a restricted state due to the second rotational shaft 50(2) and the bearing member 55b(2).

When the flow of the retained oil to the drain port 11 is slow, a communicating groove 59 extending in the axial direction over the bearing member 55b(2) can be formed in the outer circumferential surface of the second rotational shaft 50(2) as shown in FIG. 7.

Below, the supply line 150 will now be described.

In the present embodiment, as shown in FIG. 6, the supply line 150 is configured to receive oil from a charge line 110 that replenishes the pair of hydraulic oil lines 100 with hydraulic oil.

Figure 8:
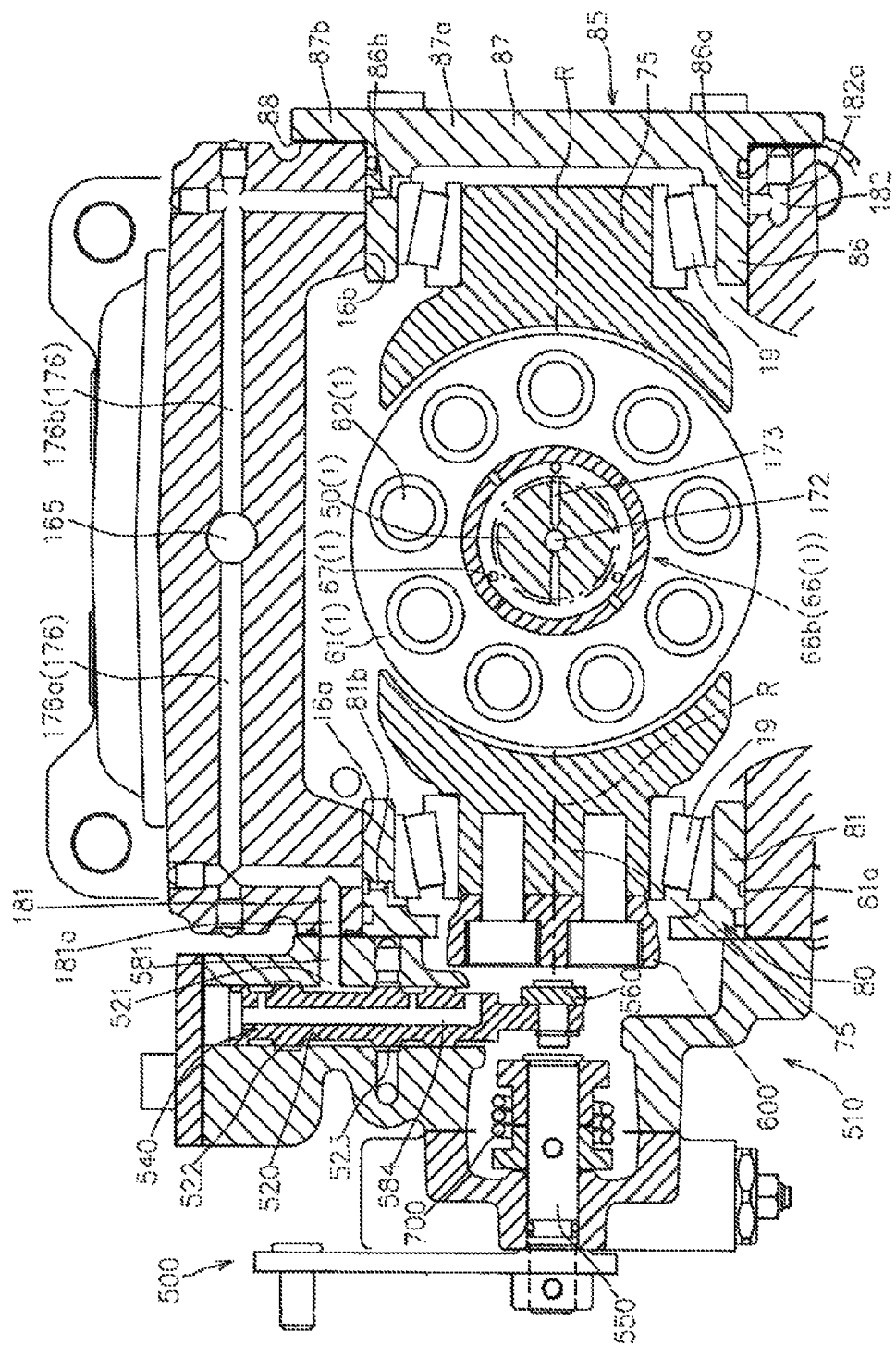
FIG. 8 is a cross-sectional view taken along the line VIII-VIII in FIG. 5.
Figure 9:
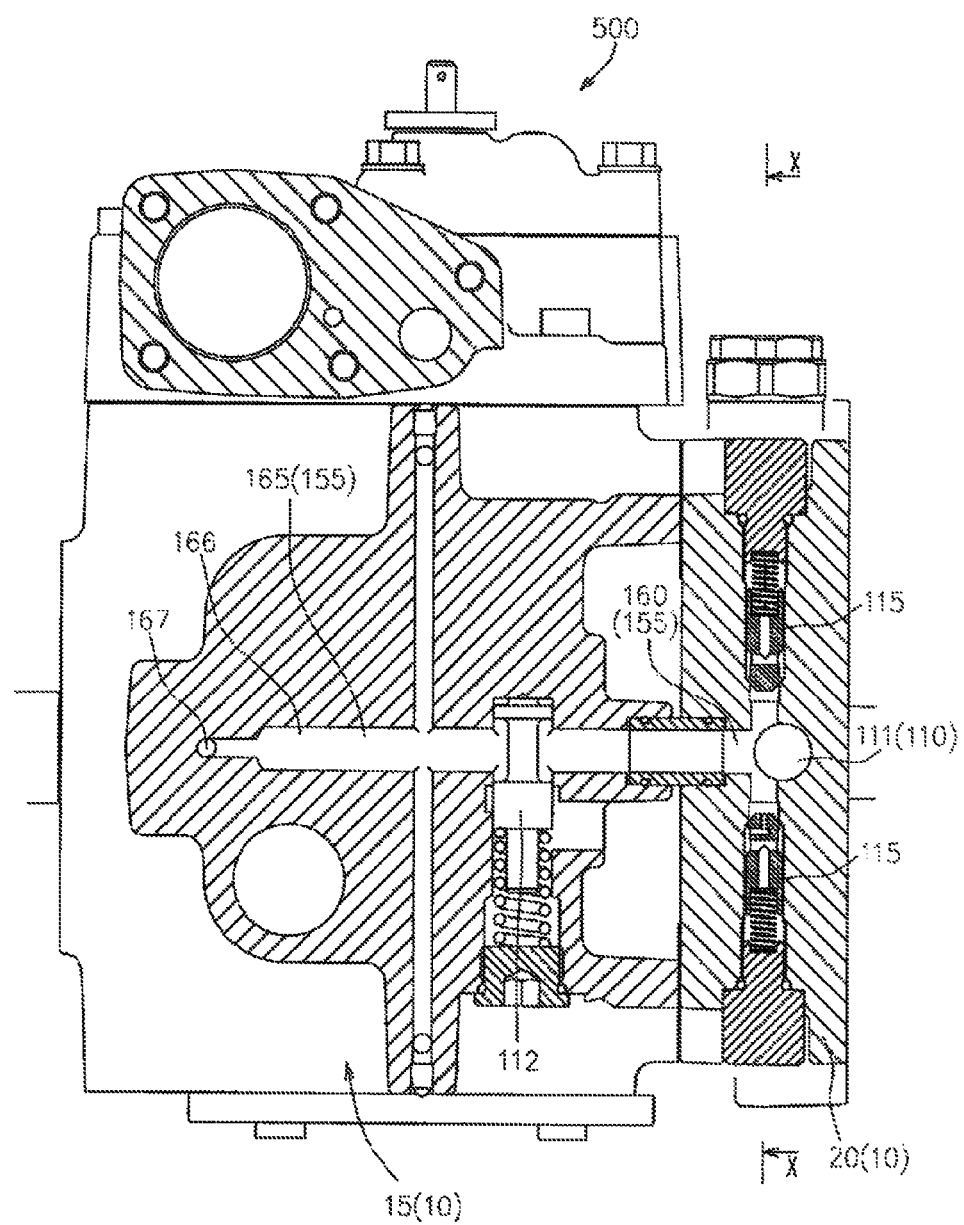
FIG. 9 is a cross-sectional view taken along the line IX-IX in FIG. 4.
Figure 10:
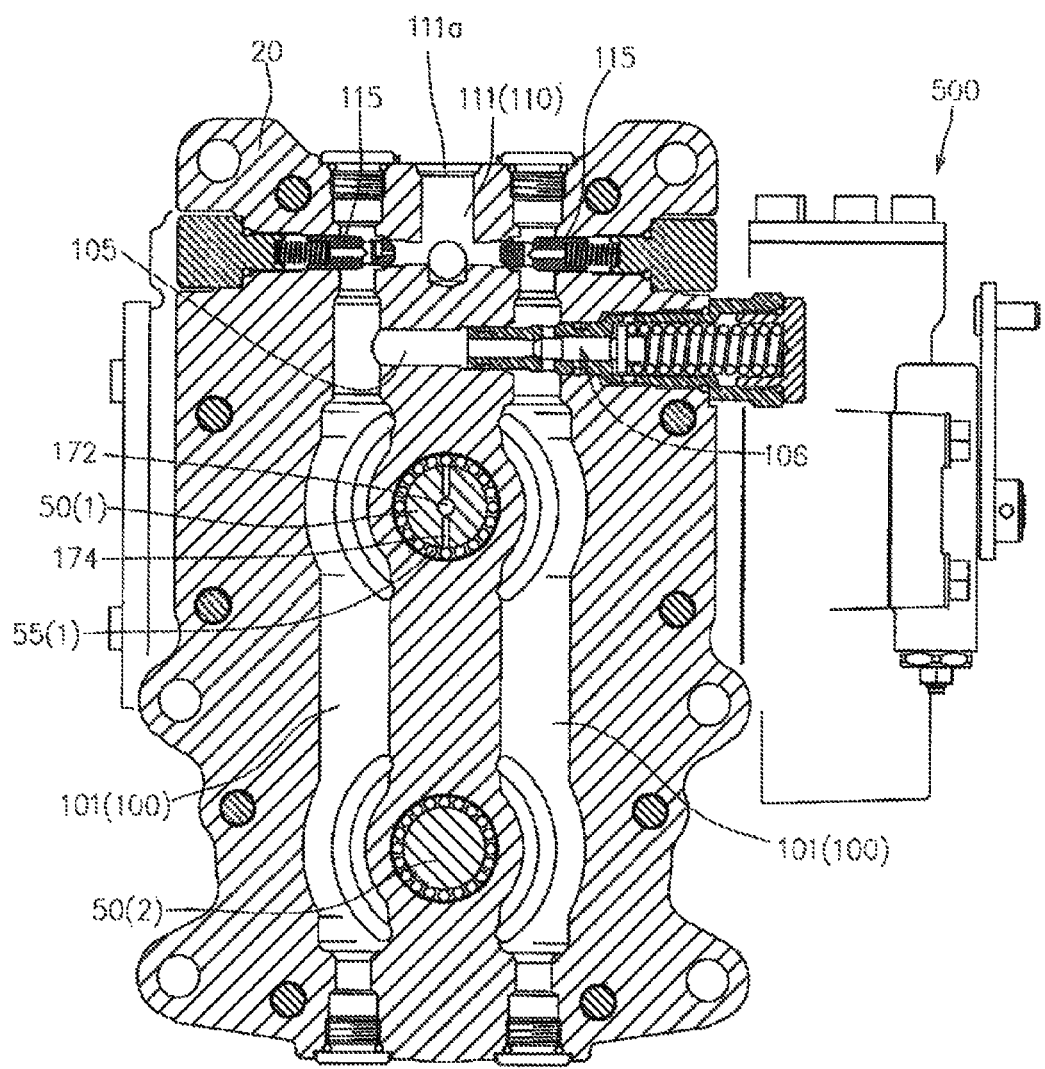
FIG. 10 is a cross-sectional view taken along the line X-X in FIG. 9.

FIGS. 8 to 10 respectively show cross-sectional views taken along the lines VIII-VIII in FIG. 5, IX-IX in FIG. 4, and X-X in FIG. 9.

As shown in FIGS. 5, 6, and 10, the port block 20 comprises a pair of hydraulic oil passages 101 that form the pair of hydraulic oil lines 100 and a charge oil passage 111 that forms the charge line 110, the first end of which is fluidly connected to an oil source and the second end of which is fluidly connected to the pair of hydraulic oil lines 100 via a pair of check valves 115. The term "second end" as used herein refers to the end that is opposite to the "first end".

In the present embodiment, as shown in FIG. 6, an auxiliary pump driven by the driving source 900 is employed as the aforementioned oil source.

As shown in FIG. 6, the charge line 110 is set at a predetermined oil pressure by a relief valve 112.

In the present embodiment, as shown in FIG. 6, the pair of hydraulic oil lines 100 are fluidly connected to each other by a communicating line 105 provided with a high-pressure relief valve 106 that acts bidirectionally, and when the oil pressure of one of the pair of hydraulic oil lines 100 exceeds a predetermined oil pressure, hydraulic oil flows into the other hydraulic oil line 100 from said one hydraulic oil line 100.

This configuration makes it possible to effectively prevent the pair of hydraulic oil lines 100 from reaching an abnormally high pressure.

In the present embodiment, as shown in FIG. 10, the communicating line 105 and the high-pressure relief valve 106 are provided in the port block 20.

In the present embodiment, the supply line 150 has a supply oil passage 155 formed in the housing 10.

The supply oil passage 155 has a first end side that is fluidly connected to the charge oil passage 111 on the more upstream side in the charge oil flow direction than the pair of check valves 115 are, and a second end side that opens toward the first axial piston member 60(1).

This configuration makes it possible to simplify the supply line 150.

As shown in, for example, FIGS. 3, 4, and 9, the supply oil passage 155 comprises a port-block-side supply oil passage 160 formed in the port block 20, a housing-body-side supply oil passage 165 formed in the housing body 15, and a rotational-shaft-side supply oil passage 170 formed in the first rotational shaft 50(1).

Specifically, as shown in FIGS. 4, 9, and 10, the charge oil passage 111 has a first end that opens to the external surface to form a charge port 111a, and a second end that branches in two directions and is fluidly connected to the pair of hydraulic oil passages 101 via the pair of check valves 115.

As shown in FIGS. 4 and 9, the port-block-side supply oil passage 160 has a first end that is fluidly connected to the charge oil passage 111 on the more upstream side in the charge oil flow direction than the pair of check valves 115 are, and a second end that opens to a portion in contact with the peripheral wall 16 of the housing body 15.

As shown in FIG. 4, the housing-body-side supply oil passage 165 has a first end that opens to a portion in contact with the port block 20 so as to be fluidly connected to the second end of the port-block-side supply oil passage 160, and a second end that opens to a portion of the first bearing hole 18b(1) formed in the end wall 17, which is in slide-contact with the first rotational shaft 50(1).

Specifically, as shown in, for example, FIG. 4, the housing-body-side supply oil passage 165 comprises a first oil hole 166 formed in the peripheral wall 16 so as to be fluidly connected to the port-block-side supply oil passage 160 and extend in the axial direction of the first rotational shaft 50(1) and a second oil hole 167 formed in the end wall 17 so as to have a first end is fluidly connected to the first oil hole 166 and a second end opened to a portion of the first bearing hole 18b(1) in slide-contact with the first rotational shaft 50(1).

In the present embodiment, as shown in FIG. 9, the relief valve 112 is attached to the peripheral wall 16 so as to be able to act on the first oil hole 166.

The rotational-shaft-side supply oil passage 170 is configured to guide lubricating oil supplied via the housing-body-side supply oil passage 165 toward the first axial piston member 60(1).

Specifically, as shown in FIGS. 4, 5, and 8, the first axial piston member 60(1) comprises a cylinder block 61(1) that is supported by the first rotational shaft 50(1) so as not to be relatively rotatable with respect thereto and has a plurality of cylinder holes disposed around the axis of the first rotational shaft 50(1), and a plurality of pistons 62(1) that are accommodated in the plurality of cylinder holes in a reciprocating manner.

The second axial piston member 60(2) has substantially the same configuration as the first axial piston member 60(1).

Therefore, in the drawings, the same or corresponding components are provided with same reference numbers with (2) attached to the end.

The first end side in the axial direction of the cylinder block 61(1) is in contact with the port block 20 via a distribution valve plate 25(1), and free ends of the plurality of pistons 62(1) extend from the plurality of cylinder holes toward the second end side in the axial direction (the side opposite to the port block 20).

The free ends of the plurality of pistons 62(1) are directly or indirectly engaged with the first swash plate 70(1), the reciprocating range of the plurality of pistons 62(1) is changed according to the tilt angle of the first swash plate 70(1), and, accordingly, the volume of the first axial piston member 60(1) is changed.

In this configuration, as shown in, for example, FIGS. 4 and 5, the rotational-shaft-side supply oil passage 170 comprises an receiving oil hole 171 that has a first end opening to the external surface of the first rotational shaft 50(1) so as to be fluidly connected to the second end of the housing-body-side lubricating oil passage 165, an axial oil hole 172 that is fluidly connected to the receiving oil hole 171 and extends in the axial direction, and a first lubricating oil hole 173 that has a first end fluidly connected to the axial oil hole 172 and a second end opening to the external surface of the first rotational shaft 50(1) near the engagement portion between the free ends of the plurality of pistons 62(1) and the swash plate body 71 of the first swash plate 70(1).

Here, the lubricating action by lubricating oil supplied from the first lubricating oil hole 173 will now be described.

As shown in FIG. 5, the axial piston device 1 further comprises a spring 65(1) that biases the cylinder block 61(1) toward the distribution valve plate 25(1) and a spring receiving member 66(1) that is supported by the first rotational shaft 50(1) so as to catch the end of the spring 65(1) on the side opposite to the port block 20.

That is, the cylinder block 61(1) is supported by the first rotational shaft 50(1) so as not to be relatively rotatable with respect thereto and so as to be movable in the axial direction, and is biased by the spring 65(1) such that the first end side in the axial direction is pressed against the distribution valve plate 25(1).

Specifically, the cylinder block 61(1) has a cylindrical small-diameter part 61*a* that is supported by the first rotational shaft 50(1) so as not to be relatively rotatable with respect thereto and so as to be movable in the axial direction and a cylindrical large-diameter part 61*b* that extends outward in the radial direction from the cylindrical small-diameter part 61*a*.

The cylindrical large-diameter part 61*b* has the plurality of cylinder holes, and the end face of which on the first end side in the axial direction is in contact with the distribution valve plate 25(1).

The end of the cylindrical small-diameter part 61*a* on the first end side in the axial direction (the side adjacent to the port block 20) terminates more toward the second end side in the axial direction (the side away from the port block 20) than the end of the cylindrical large-diameter part 61*b* on the first end side in the axial direction (the end in contact with the distribution valve plate 25(1)) does, so that an annular space is defined between the inner circumferential surface of a portion of the cylindrical large-diameter part 61*b* located on the first end side in the axial direction and the outer circumferential surface of the first rotational shaft 50(1).

This annular space forms a space for accommodating the spring 65(1).

The end of the cylindrical small-diameter part 61*a* on the second end side in the axial direction extends more toward the second end side in the axial direction than the end of the cylindrical large-diameter part 61*b* on the second end side in the axial direction does, and the second end side in the axial direction of the cylindrical small-diameter part 61*a* forms an annular projection.

As shown in FIG. 5, the spring receiving member 66(1) is in a cup shape having an end wall part 66*a* that is supported by the first rotational shaft 50(1) so as not to be relatively rotatable with respect thereto on the more second end side in the axial direction than the cylindrical small diameter part 61*a* is, and a peripheral wall part 66*b* that extends outward in the radial direction and toward the first end side in the axial direction from the end wall part 66*a* so as to surround a portion of the cylindrical small-diameter part 61*a* located on the second end side in the axial direction.

The spring receiving member 66(1) is disposed such that a pocket space is formed between the end wall part 66*a* and the end of the cylindrical small-diameter part 61*a* on the second end side in the axial direction, and its movement toward the second end side in the axial direction is inhibited.

In the present embodiment, as shown in FIGS. 4 and 5, the sash plate body 71 of the first swash plate 70(1) and the free ends of the plurality of pistons 62(1) are in engagement via a bearing member. A central opening into which the first rotational shaft 50(1) is inserted is provided in the bearing member.

On the other hand, the peripheral wall part 66*b* of the spring receiving member 66(1) has an annular inclined surface region that extends from a small-diameter portion having a diameter smaller than the aforementioned central opening to a large-diameter portion that is located more toward the first end side in the axial direction than the small-diameter portion is and has a diameter larger than the central opening, and the diameter of the annular inclined surface region gradually increases from the small-diameter portion toward the large-diameter portion.

Movement of the spring receiving member 66(1) having this configuration toward the second end side in the axial direction is inhibited due to the engagement of the annular inclined surface region with the central opening.

In the cylindrical small-diameter part 61*a*, through-holes are formed in the axial direction, and rod-like members 67(1) are inserted into the through-holes.

The first end side of the rod-like members 67(1) enters the aforementioned annular space, and the second end side is in engagement with the end wall part 66*a* of the spring receiving member 66(1).

The first end side in the axial direction of the spring 65(1) accommodated in the annular space is in engagement with a retaining ring 68(1) provided on the inner circumferential surface of the cylindrical large-diameter part 61*b*, and the second end side in the axial direction is in engagement with the first end side in the axial direction of the rod-like members 67(1), thereby biasing the cylinder block 61(1) toward the first end side in the axial direction.

In the present embodiment, the first end side and the second end side of the spring 65(1) are in engagement with the retaining ring 68(1) and the rod-like members 67(1) via sliding rings, respectively.

The second end of the first lubricating oil hole 173 opens to the external surface of the first rotational shaft 50(1) so as to face the pocket space.

In the spring receiving member 66(1), a restriction hole is formed that causes the pocket space to open toward the engagement portion between the free ends of the plurality of pistons 62(1) and the swash plate body 71 of the first movable swash plate 70(1).

Due to this configuration, oil from the first lubricating oil hole 173 is effectively supplied to a portion of the cylinder block 61(1) supported by the first rotational shaft 50(1) (i.e., the inner circumferential surface of the cylindrical small-diameter part 61*a*) and to the engagement portion between the free ends of the plurality of pistons 62(1) and the swash plate body 71 of the first swash plate 70(1).

In the present embodiment, as shown in FIGS. 4 and 5, the supply oil passage 155 further comprises a second lubricating oil hole 174 that guides lubricating oil toward the bearing member 55*a*(1) attached to the port block 20 for supporting the first end side in the axial direction of the first rotational shaft. 50(1) so as to be axially rotatable and a third lubricating oil hole 175 that guides lubricating oil toward the bearing member 55*b*(1) attached to the end wall 17 for supporting the second end side in the axial direction of the first rotational shaft 50(1) so as to be axially rotatable.

Specifically, as shown in FIGS. 4 and 5, the second lubricating oil hole 174 has a first end that is fluidly connected to the axial oil hole 172 and a second end that opens toward the bearing member 55*a*(1).

The third lubricating oil hole 175 has a first end that is fluidly connected to the housing-body-side supply oil passage 165 and a second end that opens toward the bearing member 55b(1).

In the present embodiment, the first end of the third lubricating oil hole 175 is fluidly connected to the housing-body-side supply oil passage 165, but it is possible, instead, that the first end of the third lubricating oil hole 175 is fluidly connected to the rotational-shaft-side supply oil passage 170.

As described above, in the present embodiment, the first swash plate 70(1) is a movable swash plate capable of tilting around the swinging axis R based on external operation.

In this configuration, the supply oil passage 155 is preferably configured to supply lubricating oil also to the portion supporting the first swash plate 70(1).

Specifically, as shown in FIGS. 5 and 8, the first swash plate 70(1) comprises base bodies 75 that are supported by the peripheral wall 16 so as to be rotatable around the swinging axis R perpendicular to the first rotational shaft 50(1), and the swash plate body 71 that is supported by the base bodies 75 and directly or indirectly engaged with the free ends of the plurality of pistons 62(1).

More specifically, supporting holes are formed coaxially with the swinging axis R in the peripheral wall 16, and the base bodies 75 are supported by the supporting holes so as to be axially rotatable.

In the present embodiment, as shown in FIGS. 5 and 8, the first swash plate 70(1) is a trunnion-type swash plate.

Therefore, the first swash plate 70(1) has a pair of base bodies 75 and 75 that are disposed on the swinging axis R, with the swash plate body 71 being held therebetween.

That is, as shown in FIGS. 5 and 8, a first supporting hole 16a is formed coaxially with the swinging axis R in the first side surface on one side in the swinging axis R direction of the peripheral wall 16, and a second supporting hole 16b is formed coaxially with the swinging axis R in the second side surface on the other side in the swinging axis R direction of the peripheral wall 16.

In this configuration, the pair of base bodies 75 and 75 are supported so as to be axially rotatable via bearing members 19 and 19 inserted into the first and second supporting holes 16a and 16b.

The first swash plate 70(1) tilts toward one side and the other side around the swinging axis R by an operating force applied to one of the pair of base bodies 75 and 75.

As shown in, for example, FIGS. 5 to 8, the axial piston device 1 according to the present embodiment has a hydraulic servomechanism 500 for applying an operating force to the first swash plate 70(1).

A detailed configuration of the hydraulic servomechanism 500 will be described below.

As shown in FIGS. 5 and 8, a first base body 75 that receives an operating force is supported by the corresponding supporting hole 16a via a connecting coupling 80 so as to be axially rotatable, and a second base body 75 is supported by the corresponding supporting hole 16b via a blocking coupling 85 so as to be axially rotatable.

In the present embodiment, as shown in FIGS. 5 and 8, the first base body 75 is supported by the first supporting hole 16a, and the second base body 75 is supported by the second supporting hole 16b.

As shown in FIGS. 5 and 8, the connecting coupling 80 has a first cylindrical part 81 that is inserted into the supporting hole 16a, and the first base body 75 is supported by the first cylindrical part 81 via the bearing member 19 so as to be axially rotatable.

In the connecting coupling 80, the outer end side of the first cylindrical part 81 is an opening in order to allow access from outside to the first base body 75.

This opening is blocked by the hydraulic servomechanism 500 that is connected to the first side surface so as to surround the connecting coupling 80.

As shown in FIGS. 5 and 8, the blocking coupling 85 has a second cylindrical part 86 that is inserted into the supporting hole 16b and an outer wall part 87 that blocks the outer end side of the second cylindrical part 86, and the second base body 75 is supported by the second cylindrical part 86 via the bearing member 19 so as to be axially rotatable.

In the present embodiment, as shown in FIGS. 5 and 8, the outer wall part 87 has a central region 87a that blocks the outer end side of the second cylindrical part 86, and a flange region 87b that extends outward in the radial direction from the central region 87a.

Bolt holes are formed in the second side surface of the peripheral wall, and through-holes corresponding to the belt holes are formed in the flange region 87b. As shown in FIG. 3, the blocking coupling 85 is removably attached to the second side surface by bolts 89 inserted into the through-holes.

In the present embodiment, as shown in FIGS. 5 and 8, the bearing members 19 that support the pair of base bodies 75 are tapered bearing members.

In this case, it is necessary to precisely adjust the clearance between the bearing member 19 supporting the first base body 75 and the bearing member 19 supporting the second base body 75.

In the present embodiment, as shown in, for example, FIG. 5, the aforementioned clearance is adjusted by inserting a shim 88 between the flange region 87b and the second side surface.

In this configuration, the supply oil passage 155 is configured to supply lubricating oil to the supporting holes 16a and 16b that support the base bodies 75.

Specifically, as shown in FIGS. 4, 8, and 9, the supply oil passage 155 includes a fourth lubricating oil hole 176 that has a first end fluidly connected to the housing-body-side supply oil passage 165 and a second end opening to the supporting holes 16a and 16b.

As described above, in the present embodiment, the first and second supporting holes 16a and 16b are formed in the housing body 15.

Therefore, as shown in FIG. 8, the fourth lubricating oil hole 176 comprises a first-supporting-hole lubricating oil hole 176a that opens to the first supporting hole 16a, with the first end being fluidly connected to the housing-body-side supply oil passage 165, and a second-supporting-hole lubricating oil hole 176b that opens to the second supporting hole 16b, with the first end being fluidly connected to the housing-body-side supply oil passage 165.

The first cylindrical part 81 of the connecting coupling 80 comprises a first annular groove 81a that is formed in the outer circumferential surface and a first penetrating oil hole 81b that causes the first annular groove 81a to be fluidly connected to the interior of the first cylindrical part 81.

The second cylindrical part 86 of the blocking coupling 85 comprises a second annular groove 86a that is formed in the outer circumferential surface and a second penetrating oil hole 86b that causes the second annular groove 86a to be fluidly connected to the interior of the second cylindrical part 86.

The first annular groove 81a is disposed so as to be fluidly connected to the first-supporting-hole lubricating oil hole 176a, when the connecting coupling 80 is attached to the first supporting hole 16a.

The second annular groove 86a is disposed so as to be fluidly connected to the second-supporting-hole lubricating oil hole 176b, when the blocking coupling 85 is attached to the second supporting hole 16b.

In the present embodiment, the inner diameters of the first and second supporting holes 16a and 16b have the same size, and the outer diameters and the inner diameters of the first and second cylindrical parts 81 and 86 have the same sizes, so that it is possible to attach the connecting coupling 80 to the second supporting hole 16b and the blocking coupling 85 to the first supporting hole 16a.

Attachment of the connecting coupling 80 to the second supporting hole 16b causes the first annular groove 81a to be fluidly connected to the second-supporting-hole lubricating oil hole 176b, and attachment of the blocking coupling 85 to the first supporting hole 16a causes the second annular groove 86a to be fluidly connected to the first-supporting-hole lubricating oil hole 176a.

In the present embodiment, as shown in, for example, FIGS. 5 and 8, restrictors are provided in the first and second penetrating oil holes 81b and 86b for adjustment of the amounts of lubricating oil to the bearing members 19.

Here, the hydraulic servomechanism 500 will now be described.

Figure 11:
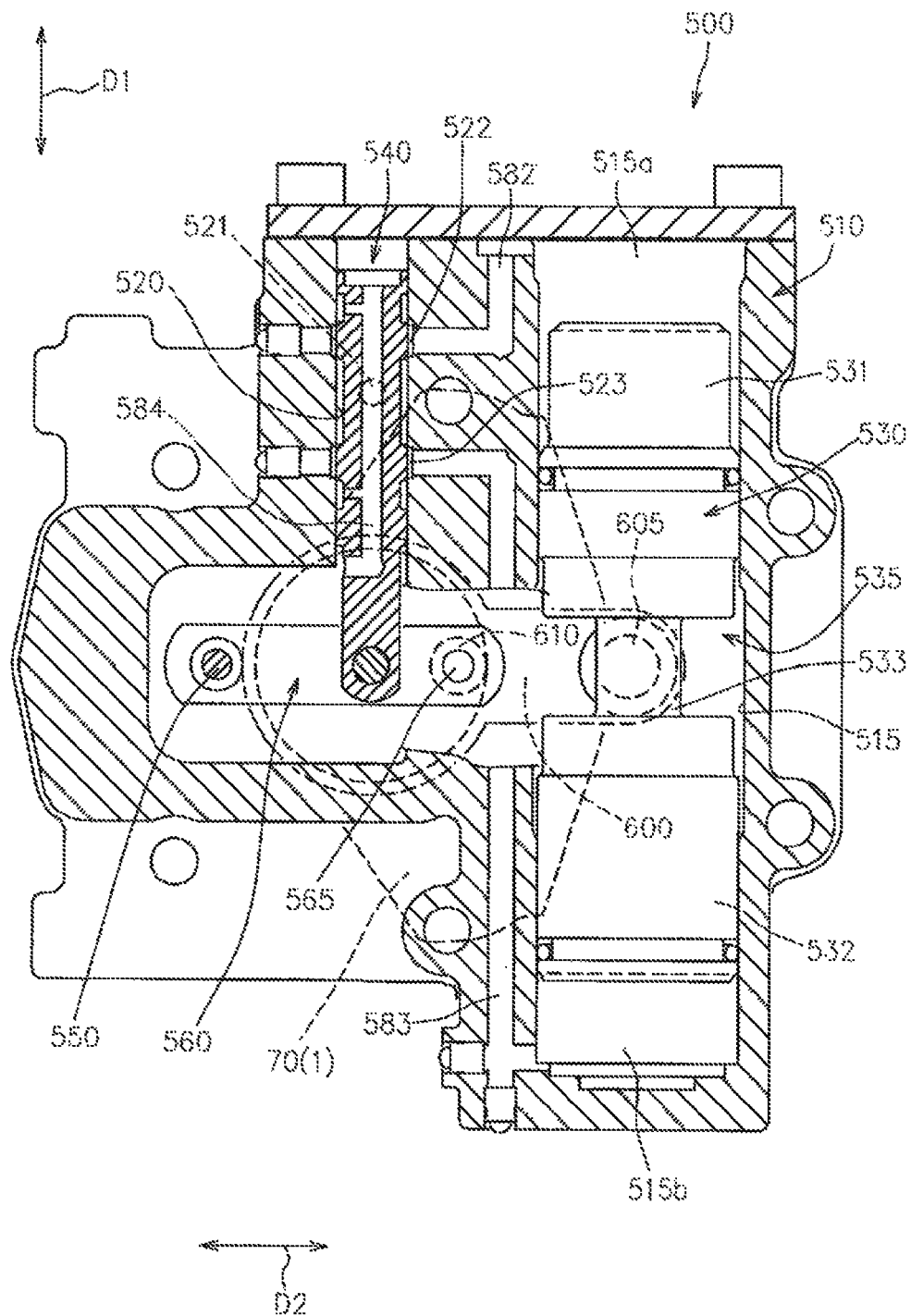
FIG. 11 is a cross-sectional view taken along the lines XI-XI in FIG. 5, and shows a state in which a spool of a hydraulic servo mechanism, which is provided in the axial piston device, is positioned at a retaining position.
Figure 12:
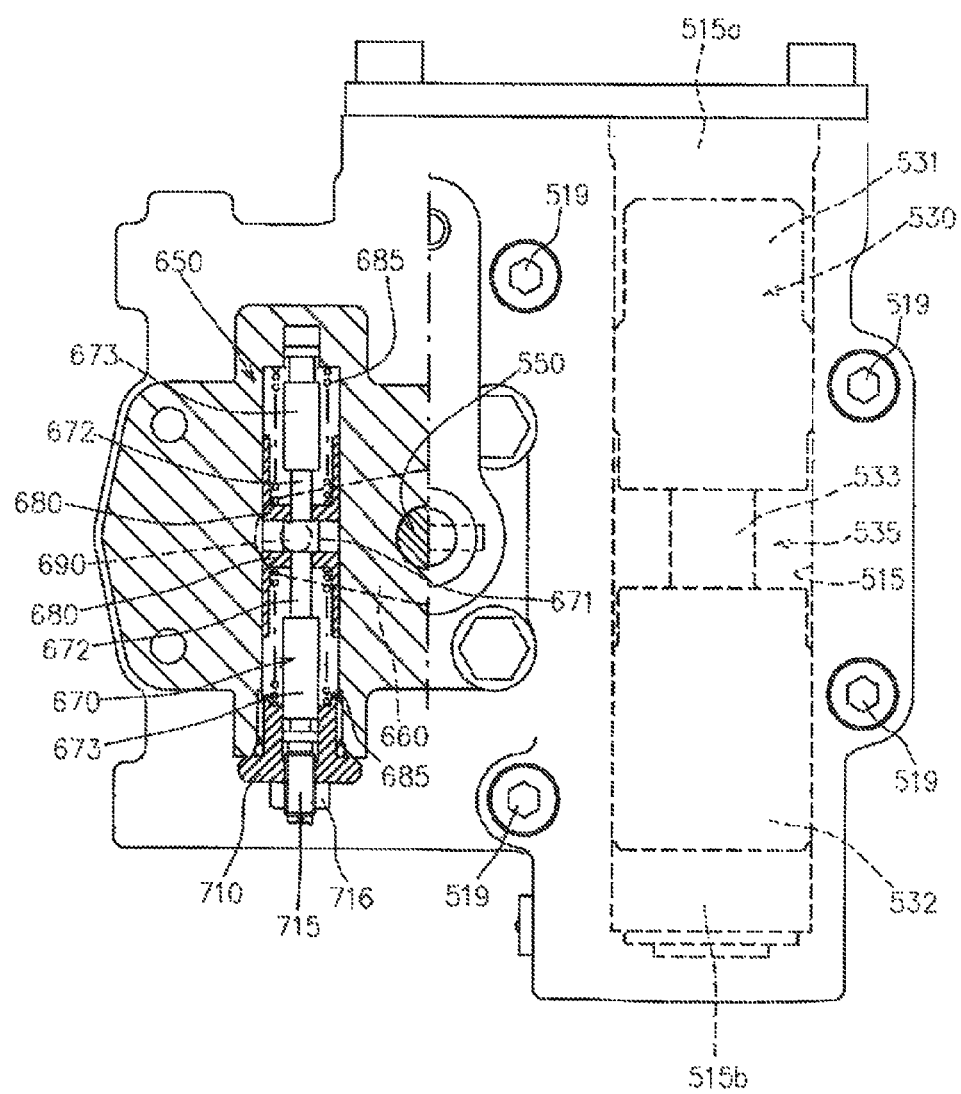
FIG. 12 is a cross-sectional view taken along the line XII-XII in FIG. 5.

FIGS. 11 and 12 show cross-sectional views taken along the lines XI-XI and XII-XII in FIG. 5, respectively.

As shown in FIGS. 5, 8, and 11, the hydraulic servomechanism 500 comprises a casing 510, a servo piston 530, a spool 540, an operating member 550, and a link arm 560 for connecting the operating member 550 and the spool 540.

The casing 510 is removably attached to the housing 10.

In the present embodiment, the casing 510 is removably attached to the first side surface of the peripheral wall 16 of the housing body 15 so as to surround the connecting coupling 80.

Specifically, bolt holes are formed in the first side surface; as shown in FIGS. 2 and 11, through-holes 518 corresponding to the bolt holes are formed in the casing 510; and as shown in FIG. 12, the casing 510 is removably attached to the first side surface by bolts 519 inserted into the through-holes 518.

As shown in FIGS. 11 and 12, an accommodating space 515 that accommodates the servo piston 530 is formed in the casing 510.

With a first oil chamber 515a and a second oil chamber 515b being defined in a fluid tight manner on the first end side and the second end side of the accommodating space 515, respectively, the servo piston 530 is accommodated in the accommodating space 515 so as to be reciprocatable in the axial direction.

As shown in FIGS. 8 and 11, furthermore, a spool chamber 520 that accommodates the spool 540 is formed in the casing 510.

The spool 540 is slidably accommodated in the spool chamber 520, and is configured to switch between a supply and discharge of pressure oil to and from the first and second oil chambers 515a and 515b according to the movement in the spool chamber 520.

Specifically, as shown in FIGS. 6, 8, and 11, an input oil passage 581 having a first end that opens to the inner surface in contact with the housing body 15 and a second end that is fluidly connected to an input port 521 of the spool chamber 520; a first oil passage 582 having a first end that is fluidly connected to a first port 522 of the spool chamber 520 and a second end that is fluidly connected to the first oil chamber 515a; a second oil passage 583 having a first end that is fluidly connected to a second port 523 of the spool chamber 520 and a second end that is fluidly connected to the second oil chamber 515b; and a drain oil passage 584 are formed in the casing 510.

In this configuration, the spool 540 can selectively take a first position in which the input port 521 is fluidly connected to the first port 522 and the drain oil passage 584 is fluidly connected to the second port 523, a second position in which the input port 521 is fluidly connected to the second port 523 and the drain oil passage 584 is fluidly connected to the first port 522, and a retaining position in which the first and second ports 522 and 523 are blocked.

The operating member 550 is supported by the casing 510, with the first end extending to the outside and the second end being operatively connected to the spool 540.

As shown in FIGS. 5 and 8, in the present embodiment, the operating member 550 is supported axially rotatably by the casing 510 so as to be parallel to the swinging axis R.

The link arm 560 operatively connects the operating member 550 and the spool 540 such that the spool 540 moves in accordance with the rotation of the operating member 550 around the axis.

The hydraulic servomechanism 500 is configured such that attachment of the housing 10 to the casing 510 causes the servo piston 530 to be operatively connected to a connecting arm 600 that is connected to the first base body 75, and the first base body 75 to be operatively connected to the link arm 560 that is connected to the spool 540.

Specifically, as shown in FIG. 5, the connecting arm 600 has a base end portion that is connected to the first base body 75 and a tip end portion that extends outward in the radial direction with reference to the swinging axis R.

The connecting arm 600 comprises an engagement projection 605 projecting outward in the radial direction and an engagement depression 610 depressed inward in the radial direction with reference to the axis of the first rotational shaft 50(1).

As shown in FIGS. 11 and 12, the servo piston 530 has first and second large-diameter parts 531 and 532 that respectively receive the oil pressures of the first oil chamber 515a and the second oil chamber 515b, and a small diameter-part 533 that forms an annular engagement groove 535 between the first and second large-diameter parts 531 and 532 and connects both large-diameter parts 531 and 532.

The servo piston 530, in a state in which an access to the engagement groove 535 is possible, is accommodated in the accommodating space 515.

Specifically, as shown in FIG. 5, the accommodating space 515 has an access opening 515a on the side facing the housing 10 when the casing 510 is attached to the housing 10, and it is possible to access the engagement groove 535 via the access opening 515a.

As shown in FIG. 5, the link arm 560 that operatively connects the operating member 570 and the spool 540 comprises an engagement projection 565 projecting inward, in the radial direction with reference to the axis of the first rotational shaft 50(1).

In this configuration, attaching the casing 510 to the housing 10 causes the engagement projection 605 of the connecting arm 600 to engage with the engagement groove 535, and the engagement projection 565 of the link arm 560 to engage with the engagement depression 610.

In the present embodiment, the hydraulic servomechanism 500 is configured to receive a supply of hydraulic oil from the supply oil passage 155.

Specifically, as shown in FIG. 8, the supply oil passage 155 has a first drawing oil hole 181, the first end of which is fluidly connected to the fourth lubricating oil hole 176, and the second end of which opens to the first side surface to form a first output port 181a.

Attachment of the casing 510 to the housing 10 causes the input oil passage 581 to be fluidly connected to the first output port 181a.

In the present embodiment, as shown in FIG. 11, the servo piston 530 and the spool 540 are disposed such that their axial directions are parallel to each other, and they are movable in the direction (hereinafter referred to as the first direction D1) perpendicular to the swinging axis R.

As shown in FIG. 11, the link arm 560 and the connecting arm 600 extend in a second direction D2 that is perpendicular to both the swinging axis R and the first direction D1.

The link arm 560 is operatively connected to the operating member 550 at a first connecting portion on one side in the axial direction, operatively connected to the connecting arm 600 at a second connecting portion on the other side in the axial direction, and operatively connected to the spool 540 at a third connecting portion between the first and second connecting portions.

The hydraulic servomechanism 500 with this configuration operates in the following manner.

When the operating member 550 is operated toward one side around the axis from an initial state in which the operating member 550 is not operated and the servo piston 530 is placed in a neutral position (see FIG. 11), the first connecting portion of the link arm 560 moves in a direction corresponding to the direction of operation of the operating member 550, with the second connecting portion being substantially fixed. That is, the link arm 560 moves around the second connecting portion.

Figure 13:
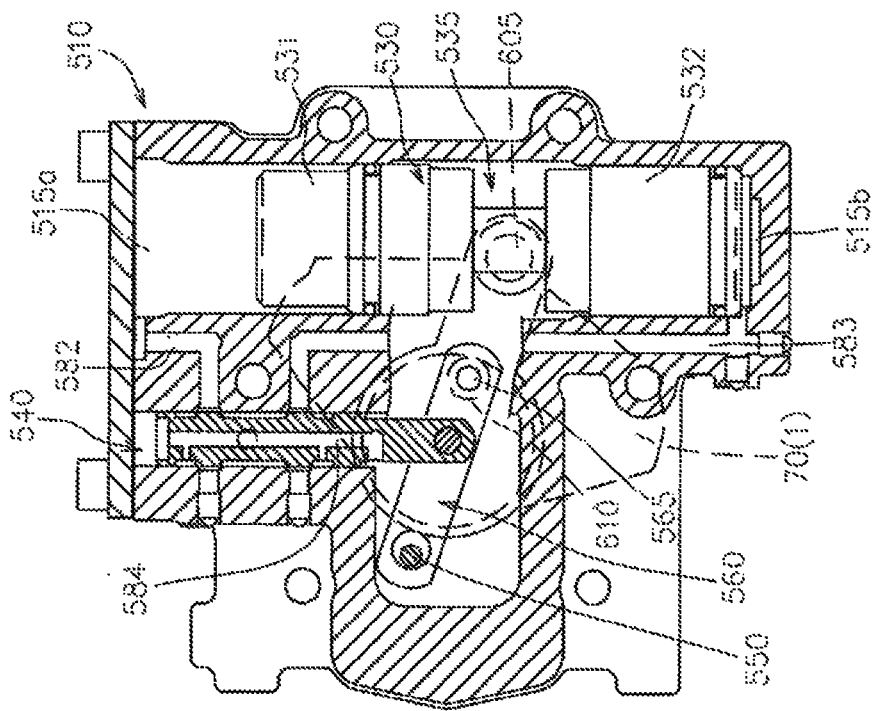
FIGS. 13A and 13B are cross-sectional views corresponding to FIG. 11, and show a state in which the spool is positioned at a first position and a state in which the spool is positioned at the retaining position.

Due to this movement of the link arm 560, the spool 540 moves toward one side in the axial direction and arrives at the first position (see FIG. 13A).

In this state, as described above, the first port 522 is fluidly connected to the input port 521, and the second port 523 is fluidly connected to the drain oil passage 584.

Accordingly, hydraulic oil is supplied to the first oil chamber 515a, and hydraulic oil is discharged from the second oil chamber 515b. Thus, the servo piston 530 moves to one side in the axial direction, and, thereby, the first swash plate 70(1) tilts toward one side around the swinging axis (for example, in the direction in which the volume of the first axial piston member 60(1) increases) via the connecting arm 600 (see FIG. 13A).

Here, when the connecting arm 600 moves in accordance with the movement of the servo piston 530 toward one side in the axial direction, a side of the link arm 560 where the second connecting portion is located moves in accordance with the movement of the connecting arm 600.

Due to this movement of the link arm 560, the spool 530 moves from the first position to the other side in the axial direction and returns to the retaining position (see FIG. 13B).

Accordingly, the first and second ports 522 and 523 are blocked, and the servo piston 530, i.e., the first swash plate 70(1), is retained in that position.

Thus, in the present embodiment, attaching the casing 510 to the housing body 15 causes the servo piston 530 to be engaged with the connecting arm 600 connected to one of the pair of base bodies 75 and also the link arm 560 that operatively connects the operating member 550 and the spool 540 to be engaged with the connecting arm 600, and, on the other hand, removing the casing 510 from the housing body 15 cancels the engagement of the servo piston 530 and the link arm 560 with the connecting arm 600.

It is therefore easy to make a configurational change between a configuration in which the first swash plate 70(1) that functions as a movable swash plate is tilted by the hydraulic servomechanism 500 and a configuration in which it is tilted without using the hydraulic servomechanism 500.

In the present embodiment, with reference to the axis of the first rotational shaft 50(1), the engagement groove 535 that opens inward in the radial direction is provided in the servo piston 530 and the engagement projection 605 that extends outward in the radial direction is provided on the connecting arm 600, but as long as the servo piston 530 engages with and disengages from the connecting arm 600 in accordance with the attachment and detachment of the casing 510 to and from the housing 10, the present invention is not limited to this configuration.

That is, it is possible to provide the servo piston 530 with an engagement projection extending inward in the radial direction and provide the connecting arm 600 with an engaging depression that opens outward in the radial direction with reference to the axis of the first rotational shaft 50(1).

Likewise, in the present embodiment, with reference to the axis of the first rotational shaft 50(1), the link arm 560 is provided with an engagement projection 565 extending inward in the radial direction and the connecting arm 600 is provided with an engaging depression 610 that opens outward in the radial direction, but, instead, it is also possible to provide the link arm 560 with an engagement depression that opens inward in the radial direction and provide the connecting arm 600 with an engaging projection that extends outward in the radial direction.

In the present embodiment, the hydraulic servomechanism 500 has a neutral position biasing mechanism 650.

As shown in FIGS. 5 and 12, the neutral position biasing mechanism 650 comprises a support arm 660 that extends in the radial direction with reference to the axis of the operating member 550 so as to face the link arm 560, with the base end portion being supported on the inner end side of the operating member 550 so as to be relatively rotatable with respect thereto; a detent rod 670 that is accommodated so as to be movable in the axial direction in an accommodating space extending in the direction perpendicular to both the operating member 550 and the support arm 660, the detent rod 670 having a central part 671 with a predetermined length in the axial direction, a pair of shaft parts 672 extending toward both sides in the axial direction from the central part 671 and having a smaller diameter than the central part 671, and a pair of base end portions 673 extending outward in the axial direction respectively from the pair of shaft parts 672 and having a larger diameter than the shaft parts 672; a pair of spring receiving members 680 fitted over the pair of shaft parts 672 so as to be movable in the axial direction; a pair of neutral springs 685 biasing the pair of spring receiving members 680 toward the central part 671; a pin member 690 supported on the free end side of the support arm 660, the pin member 690 having a first end side that is engaged with the link arm 560 and a second end side that has a width identical to the length of the central part 671 in the axial direction of the detent rod 670, and being compressed together with the central part 671 by the pair of spring receiving members 680; an cooperating member 695 having a base end portion that is supported by the operating member 550 so as not to be relatively rotatable with respect thereto and an engagement part 696 that extends along the pin member 690; and a torsion spring 700 having a central part that is fitted over the operating member 550 and a pair of free end parts that extend outward in the radial direction from the central part with reference to the axis of the operating member 550 and hold the pin member 690 and the engagement part between them.

In the present embodiment, as shown in FIG. 12, the first end side in the axial direction of the accommodating space is defined by a cap member 710, and a positioning bolt 715 is screwed into the cap member 710.

The tip of the positioning bolt 715 is engaged with the first end of the detent rod 670, and moving the detent rod 670 in the axial direction by the positioning bolt 715 makes it possible to adjust the central part 671 to a position corresponding to the neutral position of the first swash plate 70(1).

A reference number 716 in FIG. 12 refers to a lock nut that secures the positioning bolt 715.

In the present embodiment, the hydraulic servomechanism 500 is configured to be capable of attaining, in addition to a first attachment state (see FIG. 8) in which the casing 510 is attached to the housing 10 such that the servo piston 530 is engaged with the connecting arm 600 connected to one base body of the pair of the base bodies 75, which is supported by the first supporting hole 16a, and the link arm 560 is engaged with the connecting arm 600, a second attachment state in which the casing 510 is attached to the housing 10 such that the servo piston 530 is engaged with the connecting arm 600 connected to one base body of the pair of the base bodies 75, which is supported by the second supporting hole 16b, and the link arm 560 is engaged with the connecting arm 600.

Figure 14:
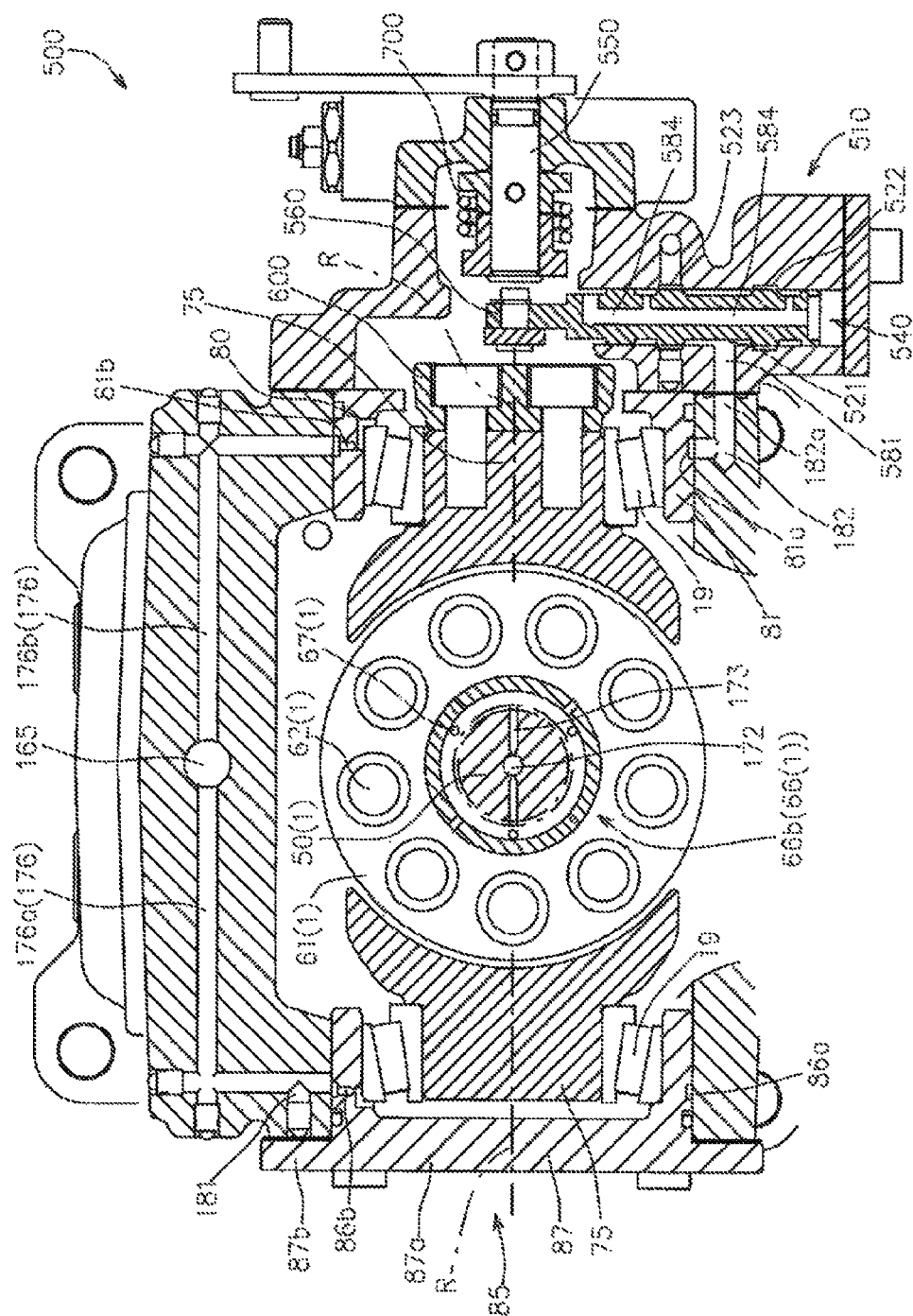
FIG. 14 is a cross-sectional view of the axial piston device corresponding to FIG. 8, and shows the axial piston device in which the hydraulic servomechanism is attached to the housing in a second attachment state, which is attained by rotating the hydraulic servomechanism in the first attachment state 180 degrees around the first rotational shaft.

FIG. 14 shows a vertical cross-sectional view of the axial piston device 1 attained when the hydraulic servomechanism 500 is attached to the housing 10 to be in the second attachment state.

As shown in FIG. 14, when the connecting coupling 80 is attached to the second supporting hole 16b and the blocking coupling 85 is attached to the first supporting hole 16a, the connecting arm is connected to the base body 75 that is supported by the second supporting hole 16b via the connecting coupling 80.

The casing 510 is configured to be capable of being attached to the second side surface of the housing 10 such that the servo piston 530 is engaged with the connecting arm 600 in this state and the link arm 561) is engaged with the connecting arm 600.

In the present embodiment, as shown in FIGS. 8 and 14, the posture of the hydraulic servomechanism 500 in the second attachment state is a posture attained by rotating the hydraulic servomechanism 500 that is in the first attachment state 180 degrees around the first rotational shaft 50(1).

In this case, the relative position of the hydraulic servomechanism 500 relative to the housing 10 in relation to the vertical direction is opposite when the hydraulic servomechanism is in the first attachment state and in the second attachment state, but adopting the following configuration makes it possible to supply hydraulic oil from the supply oil passage 155 to the hydraulic servomechanism 500 in both attachment states.

That is, as shown in FIGS. 8 and 14, the supply oil passage 155 further comprises a second drawing) oil hole 182 having an upstream side that opens to the second supporting hole 16b and a downstream side that opens to the second side surface to form a second output port 182a.

As shown in FIG. 8, when the hydraulic servomechanism 500 is in the first attachment state, the input oil passage 581 is fluidly connected to the first output port 181a.

That is, when the hydraulic servomechanism 500 is in the first attachment state, the hydraulic servomechanism 500 receives a supply of hydraulic oil via the first-supporting-hole lubricating oil hole 176a and the first drawing oil hole 181.

On the other hand, as shown in FIG. 14, when the hydraulic servomechanism 500 is in the second attachment state, the input oil passage 581 is fluidly connected to the second output port 182a.

The second drawing oil hole 182 is formed such that the upstream side is fluidly connected to the first annular groove 81a when the connecting coupling 80 is attached to the second supporting hole 16b.

That is, when the hydraulic servomechanism 500 is in the second attachment state, the hydraulic servomechanism 500 receives a supply of hydraulic oil via the second-supporting-hole lubricating oil hole 176b, the first annular groove 81a, and the second drawing oil hole 182.

When the hydraulic servomechanism 500 is in the first attachment state, the second drawing oil hole 182 is blocked by a plug (see FIG. 8), and when the hydraulic servomechanism 500 is in the second attachment state, the first drawing oil hole 181 is blocked by a plug (see FIG. 14).

Figure 15:
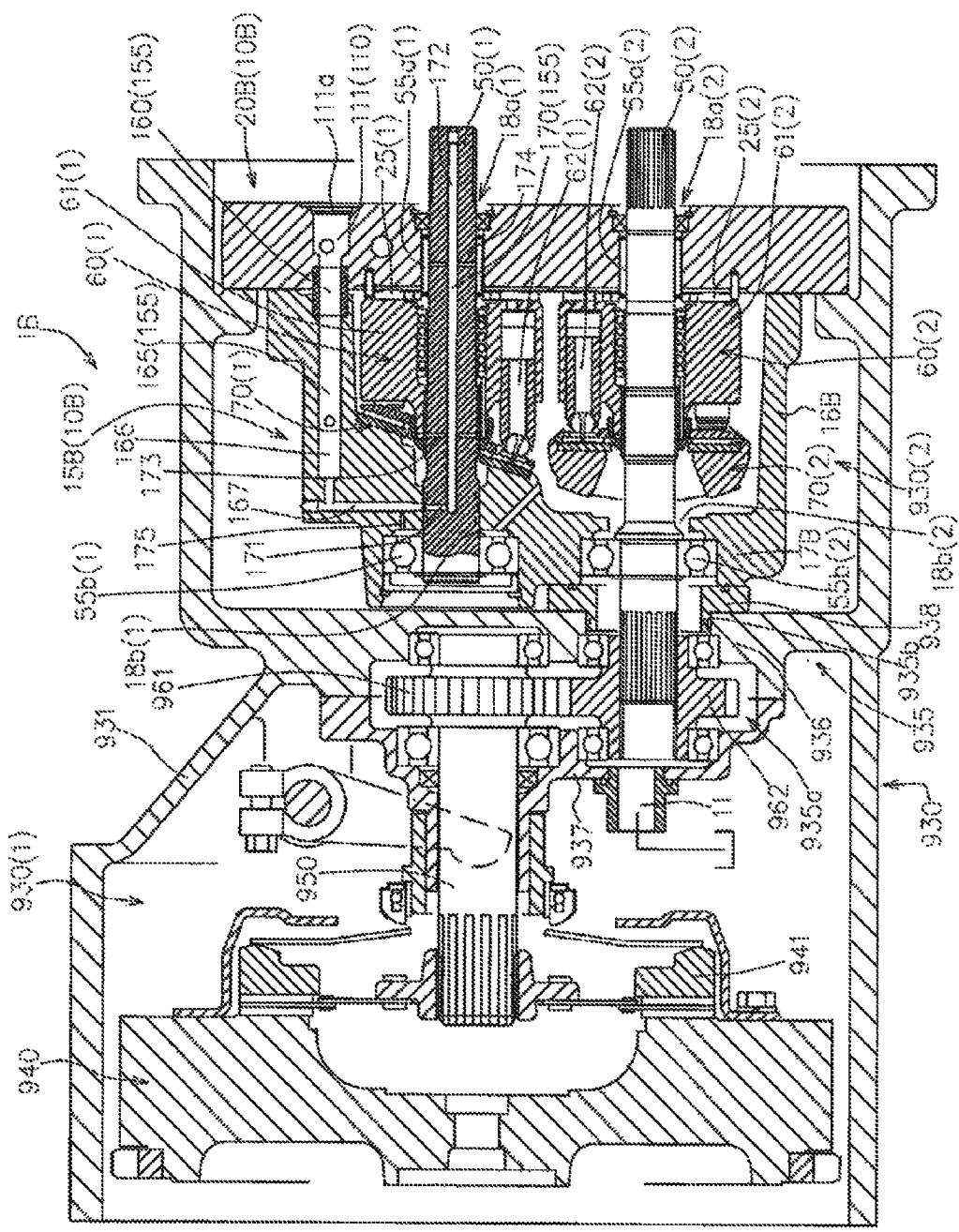
FIG. 15 is a vertical cross-sectional side view of an axial piston device according to another modification of the first embodiment.

FIG. 15 shows a vertical cross-sectional side view of an axial piston device 1B according to another modification of the present embodiment.

In FIG. 15, the same components as those in the axial piston device 1 are given the same reference numbers, and descriptions thereof are omitted.

In the present embodiment shown in, for example, FIG. 4 and the modification shown in FIG. 7, the first axial piston member 60(1) supported by the first rotational shaft 50(1) placed above functions as a hydraulic pump, and the second axial piston member 60(2) supported by the second rotational shaft 50(2) placed below functions as a hydraulic motor.

In contrast, the axial piston device 1B is configured such that the first axial piston member 60(1) supported by the first rotational shaft 50(1) placed above functions as a hydraulic motor, and the second axial piston member 60(2) supported by the second rotational shaft 50(2) placed below functions as a hydraulic pump.

As shown in FIG. 15, the axial piston device 1B according to this modification is accommodated in one chamber of a flywheel housing 930 connected to the driving source 900 (not shown in FIG. 15).

Specifically, the flywheel housing 930 has a peripheral wall 931 that forms an accommodating space and a partition wall 935 that divides the accommodating space into a first space 930(1) on the upstream side and a second space 930(2) on the downstream side relative to the direction of power transmission.

As shown in FIG. 15, a flywheel 940 equipped with a clutch 941 connected to the output shaft of the driving source 900 is accommodated in the first space 930(1), and a clutch output shaft 950 is connected to the flywheel 940.

The partition wall 935 is provided with a hollow space 935a that is separated in a liquid tight manner from the first space 930(1).

A speed-increasing gear train of a parallel gear type including a large gear 961 supported by the clutch output shaft 950 and a small gear 962 supported by the second rotational shaft 50(2) so as to mesh with the large gear 961 is accommodated in the hollow space 935a.

Compared with the axial piston device 1, the axial piston device 1B comprises a housing 10B in place of the housing 10.

The housing 10B comprises a housing body 15B having an opening into which the first and second axial piston members 60(1) and 60(2) can be inserted and a port block 20B removably attached to the housing body 15B so as to block the opening.

The port block 20B has substantially the same configuration as the port block 20 except that the arrangement of the oil passages is changed and the port block is connectable to the flywheel housing 930.

The housing body 15B has a peripheral wall 16B that has the aforementioned opening on one side in the axial direction and surrounds the first and second axial piston members 60(1) and 60(2) and an end wall 17B that blocks the other side in the axial direction of the peripheral wall 16B.

The first and second rotational shafts 50(1) and 50(2) are supported by the end wall 17B and the port block 20B via the bearing members 55a(1), 55b(1), 55a(2), and 55b(2).

The housing 10B is provided with the drain port 11.

The drain port 11 is provided in a place that brings about such an oil surface level of the retained oil that the second axial piston member 60(2) supported by the second rotational shaft 50(2) placed below is partially or entirely immersed and the first axial piston member 60(1) supported by the first rotational shaft 50(1) placed above is not immersed.

In this modification, the second swash plate 70(2) defining the volume of the second axial piston member 60(2) that is supported by the second rotational shaft 50(2) and functions as a hydraulic pump is a movable swash plate, and the first swash plate 70(1) defining the volume of the first axial piston member 60(1) that is supported by the first rotational shaft 50(1) and functions as a hydraulic motor is a fixed swash plate.

In this modification, the vertical position of the drain port 11 is set such that a portion of the housing 10B, which supports the second swash plate 70(2) configured as a movable swash plate, is also lubricated by the retained oil.

In the configuration shown in FIG. 15, the drain port 11 is provided at substantially the same height as the axial position of the second rotational shaft 50(2).

Preferably, it is possible to configure the speed-increasing gear train as well is lubricated by the retained oil in the housing 10B.

Specifically, as shown in FIG. 15, it is possible to provide the partition wall 935 with a communicating hole 935b that causes the inner space of the housing 10B and the hollow space 935a to be fluidly connected.

In this modification, the partition wall 935 has a first partition wall 936 on the side close to the axial piston device 1B and a second partition wall 937 away from the first partition wall 936 toward the side opposite to the axial piston device 1B such that the hollow space 935a is formed between the first partition wall 936 and the second partition wall 937.

The communicating hole 935b is formed in the first partition wall 936, and the communicating hole 935b is fluidly connected to the second bearing hole 18b(2) formed in the end wall 17B via a hollow connecting member 938.

The drain port 11 is provided in the second partition wall 937.

According to this configuration, it is possible to effectively prevent retention of oil in the hollow space 935a while lubricating the speed-increasing gear train by the retained oil in the housing 10B.

The first axial piston member 60(1) supported by the first rotational shaft 50(1) placed above is lubricated via the supply oil passage 155, the first end side of which is fluidly connected to the oil source. This point is identical to the axial piston device 1, and in FIG. 15, the same components as those in the axial piston device 1 are given the same reference numbers.

In the axial piston device 1B according to this modification as well, it is possible to prevent or reduce rotational resistance to the first axial piston member 60(1) caused by the retained oil, while effectively ensuring lubrication of the first and second axial piston members 60(1) and 60(2).

Second Embodiment

Below, another embodiment of the present invention will now be described with reference to the attached drawings.

Figure 16:
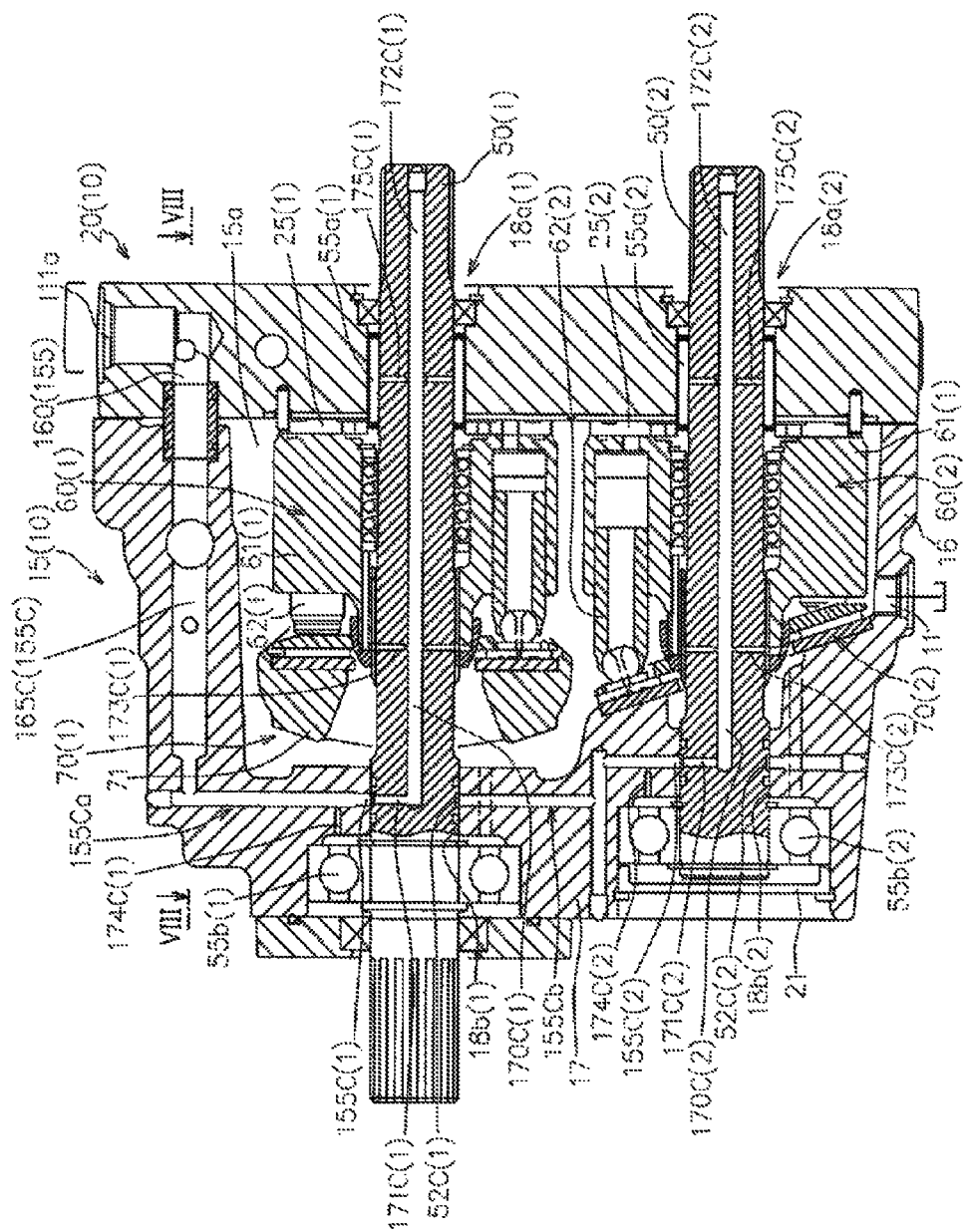
FIG. 16 is a vertical cross-sectional side view of an axial piston device according to a second embodiment of the present invention.
Figure 17:
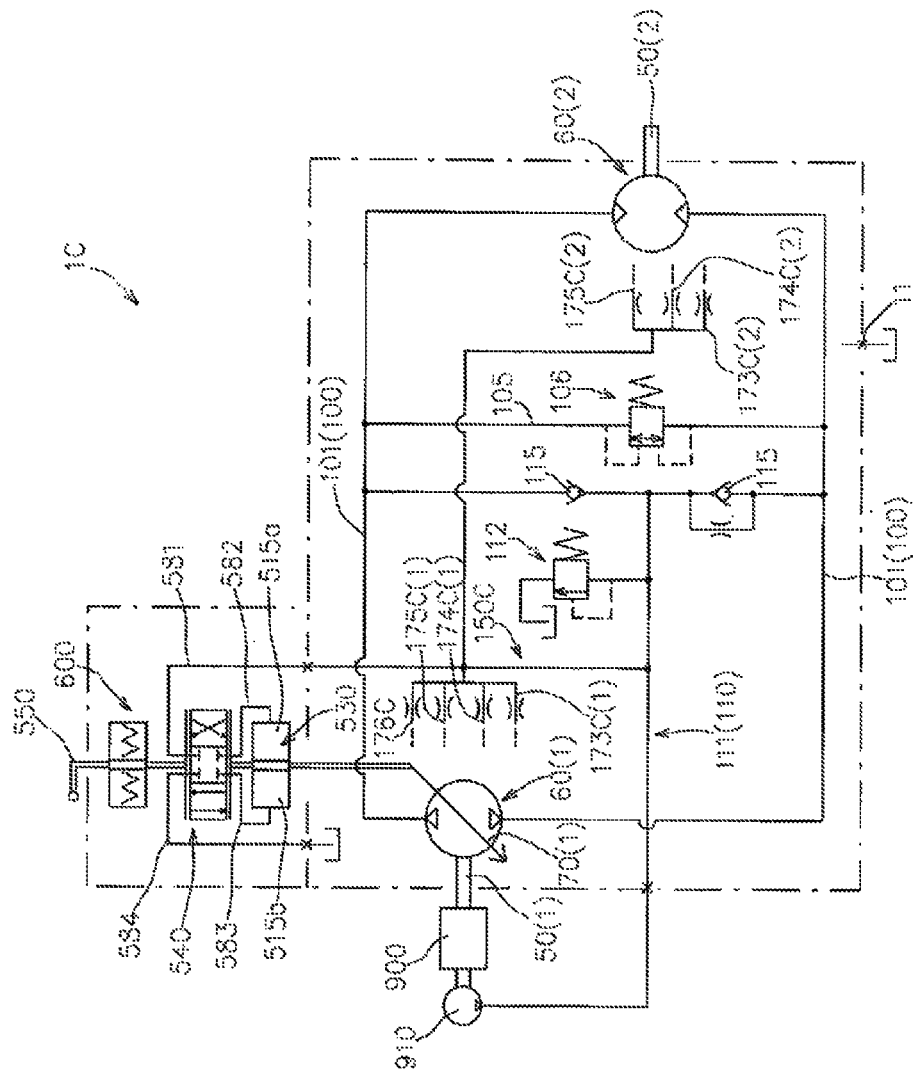
FIG. 17 is a hydraulic circuit diagram of the axial piston device shown in FIG. 16.

FIGS. 16 and 17 show a vertical cross-sectional side view and a hydraulic circuit diagram, respectively, of an axial piston device 1C according to the present embodiment.

In the drawings, the same components as those in the first embodiment are given the same reference numbers, and descriptions thereof are omitted if appropriate.

In the axial piston device 1C according to the present embodiment, the first and second axial piston members 60(1) and 60(2) are both lubricated by oil supplied via a supply oil passage 150C, and the drain port 11 formed in the housing 10 is disposed such that the oil level of the oil retained in the housing 10 after being supplied from the supply oil passage 150C and lubricating the first and second axial piston members 60(1) and 60(2) is positioned lower than the first and second axial piston members 60(1) and 60(2).

Specifically, the axial piston device 1C according to the present embodiment comprises the first and second rotational shafts 50(1) and 50(2), the first and second axial piston members 60(1) and 60(2) respectively supported by the first and second rotational shafts 50(1) and 50(2) so as not to be relatively rotatable with respect thereto, and the housing 10 accommodating the first and second axial piston members 60(1) and 60(2).

While the central part in the axial direction of the first rotational shaft 50(1) supports the first hydraulic axial piston member 60(1), the first end side and the second end side thereof in the axial direction are respectively supported so as to be axially rotatable by a first-end-side first bearing hole 18a(1) and a second-end-side first bearing hole 18b(1) formed in the housing 10.

While the central part in the axial direction of the second rotational shaft 50(2) supports the second hydraulic axial piston member 60(2), the first end side and the second end side thereof in the axial direction are respectively supported so as to be axially rotatable by a first-end-side second bearing hole 18a(2) and a second-end-side second bearing hole 18b(2) formed in the housing 10.

Moreover, the axial piston device 1C comprises the supply oil passage 150C and the drain port 11.

The supply oil passage 150C comprises a housing-side supply oil passage 155C that is formed in the housing 10 so as to be fluidly connected to the oil source and first- and second-rotational-shaft-side supply oil passages 170C(1) and 170C(2) that are respectively formed in the first and second rotational shafts 50(1) and 50(2) so as to direct the oil supplied via the housing-side supply oil passage 155C to the first and second axial piston members 60(1) and 60(2).

In the present embodiment, as shown in FIG. 16, the drain port 11 is disposed such that the oil level of the oil supplied via the supply oil passage 150C and retained in the housing 10 after lubricating the first and second axial piston members 60(1) and 60(2) is positioned lower than both the first and second axial piston members 60(1) and 60(2) in the installation state of the axial piston device 1C.

In the axial piston device 1C as well, it is possible to prevent rotational resistance to the first and second axial piston members 60(1) and 60(2) caused by the oil in the housing 10 as much as possible while effectively lubricating the first and second axial piston members 60(1) and 60(2).

In the present embodiment, the housing-side supply oil passage 155C comprises a first-rotational-shaft discharge end 155C(1) that opens to one of the first-end-side first bearing, hole 18a(1) and the second-end-side first bearing hole 15b(1) (in the embodiment shown in the drawings, the second-end-side first bearing hole 18b(1)), and a second-rotational-shaft discharge end 155C(2) that opens to one of the first-end-side second bearing hole 18a(2) and the second-end-side second bearing hole 18b(2) (in the embodiment shown in the drawings, the second-end-side second bearing hole 181b(2)).

While the first-rotational-shaft-side supply oil passage 170C(1) comprises a first receiving oil hole 171C(1) that is fluidly connected to the first-rotational-shaft discharge end 155C(1), a first axial oil hole 172C(1) that is fluidly connected to the first receiving oil hole 171C(1) and extends in the axial direction, and a first-axial-piston-member lubricating oil hole 173C(1), the first end of which is fluidly connected to the first axial oil hole 172C(1) and the second end of which opens toward the first axial piston member 60(1).

In the present embodiment, the second end of the first-axial-piston-member lubricating oil hole 173C(1) opens on the outer surface of the first rotational shaft 50(1) near the region where the free ends of the corresponding plurality of pistons 62(1) and the first swash plate 70(1) engage.

The second-rotational-shaft-side supply oil passage 170C(2) comprises a second receiving oil hole 171C(2) that is fluidly connected to the second-rotational-shaft discharge end 155C(2), a second axial oil hole 172C(2) that is fluidly connected to the second receiving oil hole 171C(2) and extends in the axial direction, and a second-axial-piston-member lubricating oil hole 173C(2), the first end of which is fluidly connected to the second axial oil hole 172C(2) and the second end of which opens toward the second axial piston member 60(2).

In the present embodiment, the second end of the second-axial-piston-member lubricating oil hole 173C(2) opens on the outer surface of the second rotational shaft 50(2) near the region where the free ends of the corresponding plurality of pistons 62(2) and the second swash plate 70(2) engage.

In the present embodiment, as shown in FIG. 16, the first receiving oil hole 171C(1) is fluidly connected to the first-rotational-shaft discharge end 155C(1) via a first rotary joint 52C(1) formed on at least one of the outer circumferential surface of the first rotational shaft 50(1) and the inner circumferential surface of the corresponding first bearing hole 180b(1), and the second receiving oil hole 171C(2) is fluidly connected to the second-rotational-shaft discharge end 155C(2) via a second rotary joint 52C(2) formed on at least one of the outer circumferential surface of the second rotational shaft 50(2) and the inner circumferential surface of the corresponding second bearing hole 18b(2).

The housing-side supply oil passage 155C comprises an upstream-side oil hole 155Ca having an upstream side that is fluidly connected to the oil source and a downstream side that forms the first-rotational-shaft discharge end 155C(1), and a downstream-side oil hole 155Cb having an upstream side that is fluidly connected to the first rotary joint 52C(1) and a downstream side that forms the second-rotational-shaft discharge end 155C(2).

In the present embodiment, as shown in FIGS. 16 and 17, the supply oil passage 150C further comprises a first-rotational-shaft first lubricating oil hole 174C(1) and a first-rotational-shaft second lubricating oil hole 175C(1) as well as a second-rotational-shaft first lubricating oil hole 174C(2) and a second-rotational-shaft second lubricating oil hole 175C(2).

The first-rotational-shaft first lubricating oil hole 174C(1) has a first end that is fluidly connected to the housing-side supply oil passage 155C and a second end that opens toward the bearing member 55b(1) attached to one first bearing hole of the first-end-side first bearing hole 18a(1) and the second-end-side first bearing hole 18b(1) (in the embodiment shown in the drawings, the second-end-side first bearing hole 18b(1)) to which the first-rotational-shaft discharge end 155C(1) opens.

Instead of fluidly connecting the first end of the first-rotational-shaft first lubricating oil hole 174C(1) to the housing-side supply oil passage 155C, it is also possible to fluidly connect it to the first-rotational-shaft-side supply oil passage 170C(1).

The first-rotational-shaft second lubricating oil hole 175C(1) has a first end that is fluidly connected to the first axial oil hole 172C(1) and a second end that opens toward the bearing member 55a(1) attached to the other first bearing hole of the first-end-side first bearing hole 18a(1) and the second-end-side first bearing hole 18b(1) (in the embodiment shown in the drawings, the first-end-side first bearing hole 18a(1)).

The second-rotational-shaft first lubricating oil hole 174C(2) has a first end that is fluidly connected to the housing-side supply oil passage 155C and a second end that opens toward the bearing member 55b(2) attached to one second hearing hole of the first-end-side second bearing hole 18a(2) and the second-end-side second bearing hole 18b(2) (in the embodiment shown in the drawings, the second-end-side second bearing hole 18b(2)), to which the second-rotational-shaft discharge end 155C(2) opens.

Instead of fluidly connecting the first end of the second-rotational-shaft first lubricating oil hole 174C(2) to the housing-side supply oil passage 155C, it is also possible to fluidly connect it to the second-rotational-shaft-side supply oil passage 170C(2).

The second-rotational-shaft second lubricating oil hole 175C(2) has a first end that is fluidly connected to the second axial oil hole 172C(2) and a second end that opens toward the bearing member 55a(2) attached to the other second bearing hole of the first-end-side second bearing hole 18a(2) and the second-end-side second bearing hole 18b(2) (in the embodiment shown in the drawings, the first-end-side second bearing hole 18a(2)).

In the present embodiment, the supply oil passage 155C further comprises a first-swash-plate lubricating oil hole 176C, which guides lubricating oil to the bearing portion for the first swash plate 70(1).

The first-swash-plate lubricating oil hole 176C has substantially the same configuration as the fourth lubricating oil hole 176.

That is, the first-swash-plate lubricating oil hole 176C comprises a first-supporting-hole lubricating oil hole, which opens to the first supporting hole 16a (see FIG. 8) while being fluidly connected to the housing-side supply oil passage 165C, and a second-supporting-hole lubricating oil hole, which opens to the second supporting hole 16b (see FIG. 8) while being fluidly connected to the housing-side supply oil passage 165C.

Third Embodiment

Below, yet another embodiment of the present invention will now be described with reference to the attached drawings.

Figure 18:
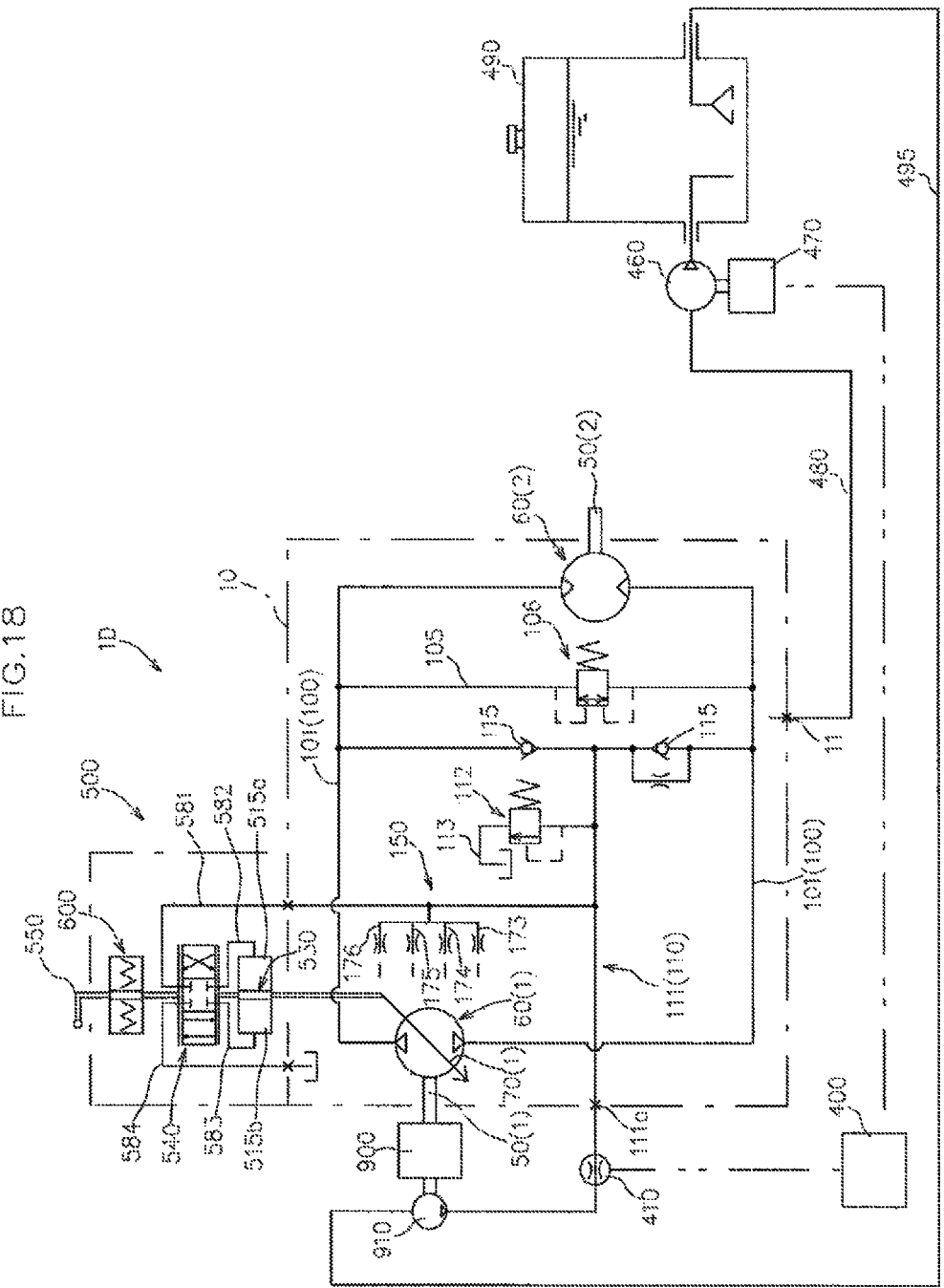
FIG. 18 is a hydraulic circuit diagram of an axial piston device according to a third embodiment of the present invention.
Figure 19:
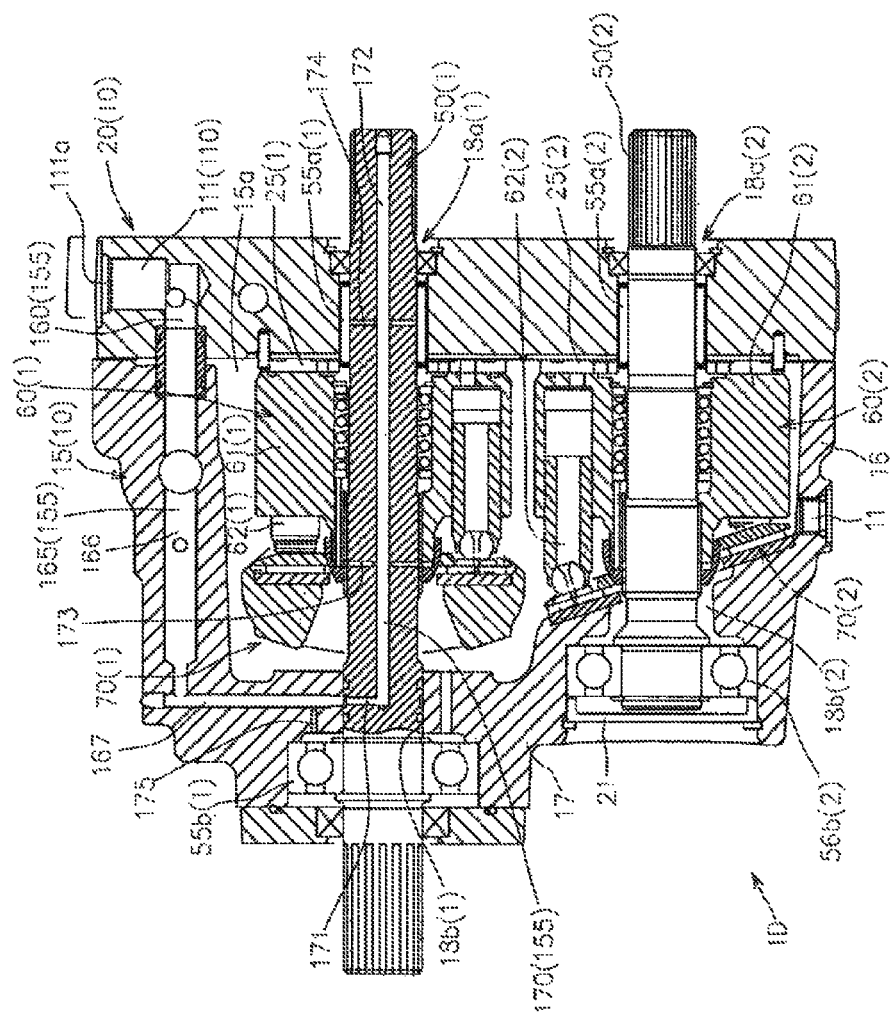
FIG. 19 is a vertical cross-sectional side view of the axial piston device shown in FIG. 18.

FIGS. 18 and 19 show a hydraulic circuit diagram and a vertical cross-sectional side view, respectively, of an axial piston device 1D according to the present embodiment.

In the drawings, the same components as those in the foregoing embodiments are given the same reference numbers, and detailed descriptions thereof are omitted if appropriate.

The axial piston device 1D according to the present embodiment is configured to actively maintain the amount of retained oil in the housing 10 at such a desired oil amount that, while effectively lubricating a hydraulic axial piston member that is at least partially immersed in the retained oil (hereinafter referred to as an immersed hydraulic axial piston member) with the retained oil, rotational resistance to the immersed hydraulic axial piston member caused by the retained oil can be reduced.

The immersed hydraulic axial piston member is a hydraulic axial piston member located on the lower side with respect to the installation state of the axial piston device, and corresponds to the second hydraulic axial piston member 60(2) in the present embodiment.

Specifically, as shown in FIGS. 18 and 19, the axial piston device 1D comprises the housing 10 capable of retaining oil; a rotational shaft supported by the housing 10 so as to be rotatable around an axis line (the second rotational shaft 50(2) in the present embodiment); the immersed hydraulic axial piston member (the second hydraulic axial piston member 60(2) in the present embodiment) that is accommodated in the housing such that it is supported by the rotational shaft so as not to be relatively rotatable and is at least partially immersed in the retained oil in the housing 10, and that forms a hydrostatic transmission by working together with another hydraulic axial piston member (hereinafter referred to as a co-operational hydraulic axial piston member) fluidly connected so as to form a closed circuit; a charge pump 910 operably driven by a charge pump power source (the driving source 900 in the present embodiment) to draw oil from an oil tank 490 and pump out charge oil for the closed circuit; a charge relief valve 112 that sets the oil pressure of the charge oil; a relief line 113 that guides relief oil from the charge relief valve 112 into the housing 10; a discharge line 480 for discharging the retained oil in the housing 10; a discharge pump 460 attached to the discharge line 480 and operably driven by a discharge pump power source 470; a control device 400; a charge oil amount detecting means that detects the amount of charge oil pumped out by the charge pump 910; and a discharge oil amount changing means that changes the amount of discharge oil discharged from the housing 10 by the discharge pump 460, wherein the control device 400 is configured to control the operation of the discharge oil amount changing means based on the charge oil amount detected by the charge oil amount detecting means.

According to this configuration, the retained-oil amount in the housing 10 can be maintained at a desired oil amount in a substantially constant manner irrespective of the state of rotational operation of the immersed hydraulic axial piston member.

Therefore, it is possible to realize a state in which lubrication of the immersed hydraulic axial piston member 60(1) with the retained oil in the housing 10 can be effectively performed while reducing rotational resistance to the immersed hydraulic axial piston member caused by the retained oil in the housing 10 as much as possible.

Moreover, according to the present embodiment, the aforementioned effects can be obtained irrespective of the installation height of the oil tank 490 relative to the axial piston device 1D.

These effects will now be described in detail.

As in the first embodiment, disposing the drain port 11 that is provided in the housing 10 at a desire height makes it possible to adjust the oil level of the retained oil retained in the housing 10.

However, in an operating state of the hydrostatic transmission, in which the first and/or second hydraulic axial piston member 60(1) and/or 60(2) performs rotational movement, the retained oil in the housing 10 moves due to the rotational movement of the first and/or second hydraulic axial piston member 60(1) and/or 60(2), and the oil level of the retained oil fluctuates.

Moreover, the extent of movement of the retained oil as well changes according to the rotational speed of the first and/or second hydraulic axial piston member 60(1) and/or 60(2).

Therefore, even when the drain port 11 is provided at a desired height, it may be difficult to maintain the retained-oil amount in the housing 10 at a desired oil amount, i.e., such an oil amount that rotational resistance to the immersed hydraulic axial piston member caused by the retained oil can be effectively reduced while effectively lubricating the immersed hydraulic axial piston member.

Moreover, in order to adjust the retained-oil level in the housing 10 by the installation height of the drain port 11, it is also necessary to install the oil tank 490 in a place lower than the drain port 11.

On the other hand, in the present embodiment, the control device 400 is configured to control the operation of the discharge oil amount changing means based on the charge oil amount detected by the charge oil amount detecting means as described above.

Here, the charge oil pumped out from the charge pump 910 is supplied to the closed circuit while excessive oil is discharged into the housing 10 via the relief line 113 from the relief valve 112, and thus the retained-oil amount retained in the housing 10 is substantially proportional to the amount of the charge oil.

Therefore, controlling the operation of the discharge oil amount changing means based on the charge oil amount detected by the charge oil amount detecting means makes it possible to effectively maintain the retained-oil amount in the housing 10 at a desired oil amount irrespective of the operational state, e.g., rotational speed, of the first and/or second hydraulic axial piston member 60(1) and/or 60(2).

Moreover, according to the configuration described above, the aforementioned effects can be obtained irrespective of the installation height of the oil tank 490 relative to the axial piston device 1D.

As shown in FIG. 18, the axial piston device 1D according to the present embodiment comprises a flow meter 410 attached to the charge line 110 that supplies the charge oil pumped out from the charge pump 910 to the closed circuit, and the flow meter 410 functions as the charge oil amount detecting means.

Instead, it is possible to provide a charge pump rotational speed detecting means (not shown) that directly or indirectly detects the rotational speed of the charge pump 910 in the axial piston device 1D, and allow data that indicate the relationship between the rotational speed of the charge pump 910 and the charge oil amount to be stored in the control device 400 in advance.

In this case, the charge pump rotational speed detecting means and the control device 400 function as the charge oil amount detecting means.

As shown in FIG. 18, in the present embodiment, the charge pump 910 is operably driven by the driving source 900 of the first hydraulic axial piston member 60(1) that functions as the hydraulic pump.

Therefore, the charge pump rotational speed detecting means may be configured to detect the output rotational speed of the driving source 900.

Moreover, as shown in FIG. 18, the axial piston device 1D according to the present embodiment comprises a discharge pump electric motor 470, the output rotational speed of which is variable, as the discharge pump power source.

In this case, the discharge pump electric motor 470 also functions as the discharge oil amount changing means.

That is, the control device 400 adjusts the output rotational speed of the discharge pump electric motor 470 and thus changes the amount of discharge oil discharged from the housing 10 by the discharge pump 460.

Figure 20:
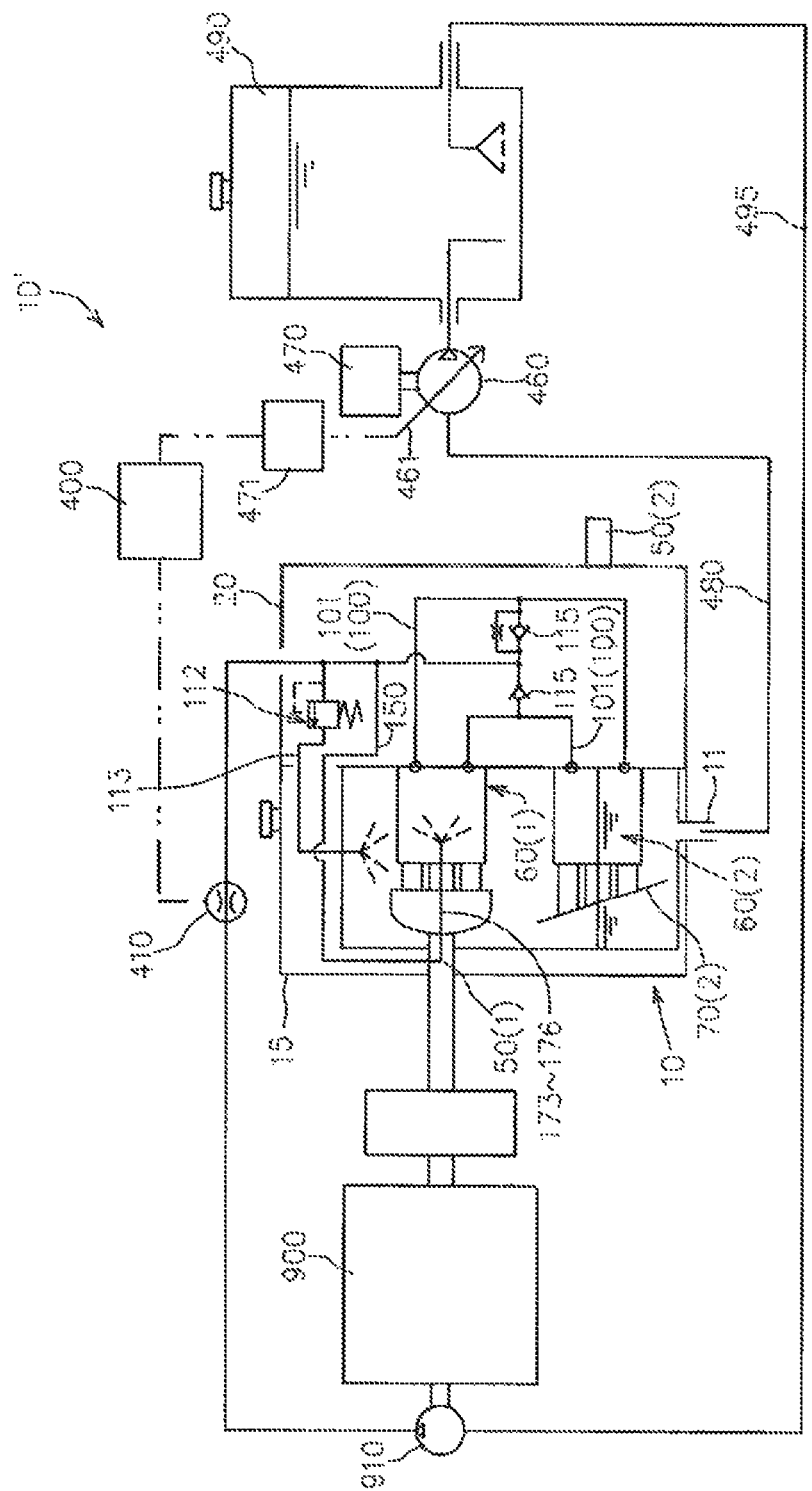
FIG. 20 is a hydraulic circuit diagram of an axial piston device according to a modification of the third embodiment.

Instead, it is also possible to configure the discharge pump 460 to be a variable-volume type, the volume of which is variable by a volume adjusting mechanism 461 as shown in FIG. 20.

The axial piston device 1D' according to this modification comprises the discharge pump electric motor 470 that drives the discharge pump 460 and a volume adjusting electric motor 471 that operates the volume adjusting mechanism 461.

In the modification shown in FIG. 20, the volume adjusting electric motor 471 and the volume adjusting mechanism 461 function as the discharge oil amount changing means.

In the modification shown in FIG. 20, the discharge pump electric motor 470 may be a constant speed output type, the output rotational speed of which is constant.

Preferably, the axial piston device 1D may be configured to correct the amount of retained oil that should be retained in the housing 10 according to the oil temperature of the retained oil in the housing 10.

That is, the viscosity of oil decreases as the oil temperature increases. When the viscosity of the retained oil is low, it is difficult to form oil film over a slide-contact part, which should be lubricated, of the immersed hydraulic axial piston member.

In consideration of this point, it is possible to configure the axial piston device 1D to comprise an oil temperature meter (not shown) that detects the retained-oil temperature in the housing 10, and the control device 400 to correct the predetermined oil amount of retained oil that should be retained in the housing 10 based on the retained-oil temperature detected by the oil temperature meter and control the operation of the discharge oil amount changing means such that the retained-oil amount is maintained at the corrected predetermined oil amount.

Specifically, it is possible to correct the predetermined oil amount such that the retained-oil amount in the housing 10 is increased when the retained-oil temperature is high.

It is also possible to make corrections such that the predetermined oil amount is continuously increased as the retained-oil temperature rises, and it is also possible to correct the predetermined oil amount in a stepwise manner such that the predetermined oil amount is corrected to be a first correction amount when the retained-oil temperature is between a first temperature T1 and a second temperature T2, and the predetermined oil amount is corrected to be a second correction amount when the retained-oil temperature exceeds the second temperature T2 up to a third temperature T3.

As in the first embodiment, the axial piston device 1D according to the present embodiment integrally has the co-operational hydraulic axial piston member accommodated in the housing 10 so as to be placed above the immersed hydraulic axial piston member.

That is, as shown in FIGS. 18 and 19, the axial piston member 1D has, in addition, a further rotational shaft (the first rotational shaft 50(1) in the present embodiment) placed above the rotational shaft (the second rotational shaft 50(2) in the present embodiment) that supports the immersed hydraulic axial piston member, and the co-operational hydraulic axial piston member (the first hydraulic axial piston member 60(1) in the present embodiment) accommodated in the housing such that it is supported by the further rotational shaft so as not to be relatively rotatable.

Moreover, as in the first embodiment, the axial piston device 1D has the movable first swash plate 70(1) that changes the volume of the co-operational hydraulic axial piston member placed above and the hydraulic servomechanism 500 that generates an operating force for tilting the first swash plate 70(1).

And, as in the first embodiment, lubricating oil is supplied to the co-operational hydraulic axial piston member via the supply oil passage 150, and hydraulic oil is supplied to the hydraulic servomechanism 500 also via the supply oil passage 150.

Fourth Embodiment

Below, yet another embodiment of the present invention will now be described with reference to the attached drawings.

Figure 21:
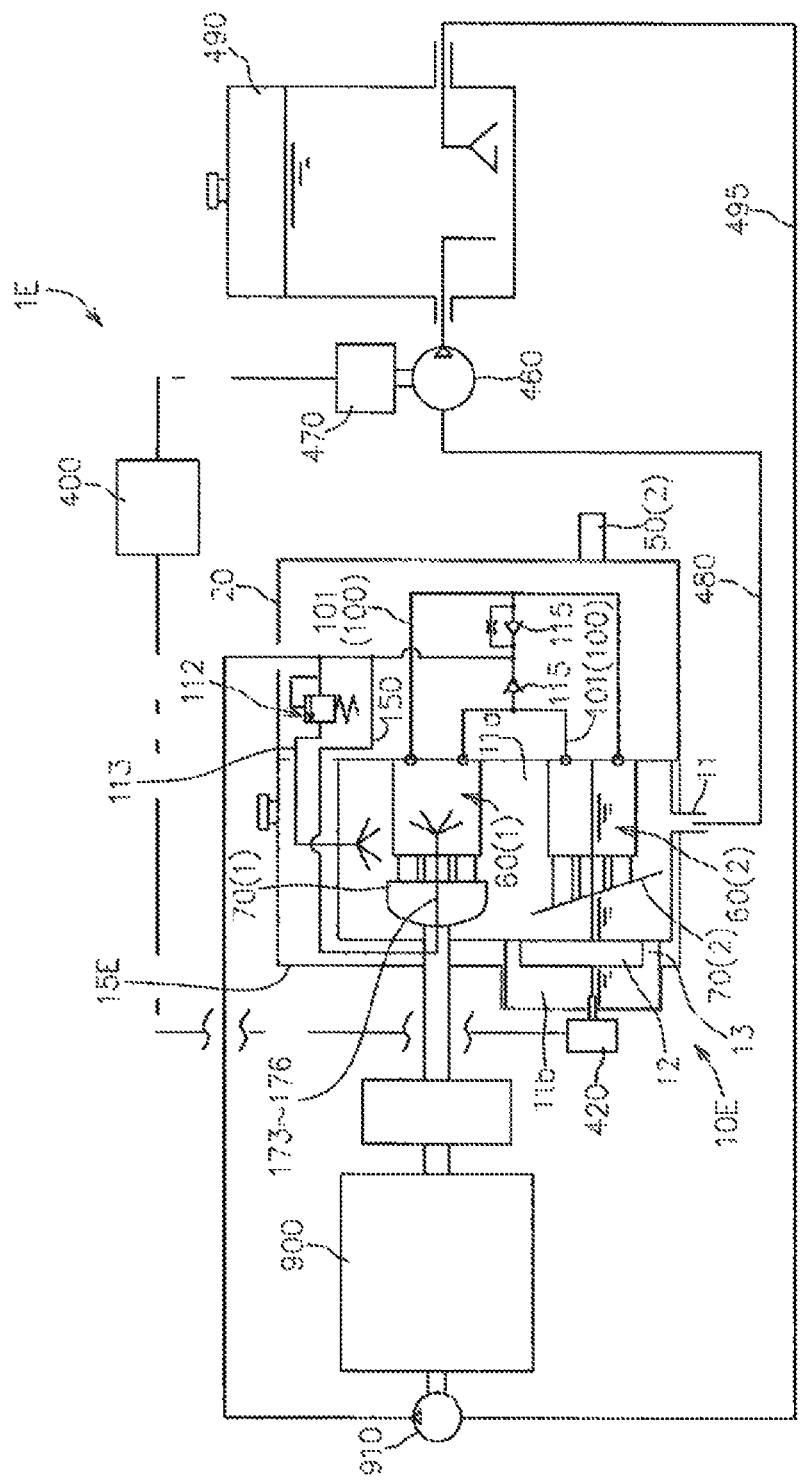
FIG. 21 is a hydraulic circuit diagram of an axial piston device according to a fourth embodiment of the present invention.

FIG. 21 shows a hydraulic circuit diagram of an axial piston device 1E according to the present embodiment.

In the drawing, the same components as those in the foregoing embodiments are given the same reference numbers, and detailed descriptions thereof are omitted if appropriate.

The axial piston device according to the present embodiment is configured to actively maintain the retained-oil amount in the housing 10 at such a desired oil amount that, while effectively lubricating the immersed hydraulic axial piston member by the retained oil, rotational resistance to the immersed hydraulic axial piston member caused by the retained oil can be reduced, based on the retained-oil level in the housing.

Specifically, in comparison to the axial piston device 1D according to the third embodiment, the axial piston device 1E has an oil level meter 420 in place of the charge oil amount detecting means and a housing 10E in place of the housing 10.

As shown in FIG. 21, in comparison to the housing 10, the housing 10E has a housing body 15E in place of the housing body 15.

The housing 10E is configured to have a main space 11a that accommodates the immersed hydraulic axial piston member (the second hydraulic axial piston member 60(2) in the present embodiment) and a sub space 11b that is separated from the main space 11a by a partition 12 and allows oil to flow to and from the main space 11a via a connecting path 13.

The oil level meter 420 is disposed in the sub space 11b so as to be electrically connected to the control device 400.

In the present embodiment, the control device 400 is configured to control the operation of the discharge oil amount changing means based on the retained-oil level detected by the oil level meter 420.

According to the axial piston device 1E having this configuration, the retained oil in the housing 10E can be effectively maintained at such a desired oil amount that, while effectively lubricating the immersed hydraulic axial piston member, rotational resistance to the immersed hydraulic axial piston member can be effectively reduced.

That is, the retained oil in the housing 10E moves due to the rotational movement of the immersed hydraulic axial piston member that is at least partially immersed in the retained oil (the second hydraulic axial piston member 60(2) in the present embodiment).

Therefore, the oil level of the retained oil greatly fluctuates in the main space 11a in which the immersed hydraulic axial piston member is accommodated, but, as described above, the sub space 11b in which the oil level meter 420 is disposed is separated from the main space 11a by the partition 12 while being fluidly connected to the main space 11a.

According to this configuration, even when the immersed hydraulic axial piston member performs rotational movement, the retained-oil level in the sub space 11b where movement of the retained oil is prevented or reduced can be precisely detected by the oil level meter 420, thus making it possible to effectively maintain the retained-oil amount in the housing 10E at a desired oil amount.

What is claimed is:

1. An axial piston device comprising a housing capable of retaining oil, a first rotational shaft supported by the housing in a rotatable manner around an axial line, a second rotational shaft placed below the first rotational shaft and supported by the housing in a rotatable manner around an axial line, a first hydraulic axial piston member accommodated in the housing while being supported by the first rotational shaft in a relatively non-rotatable manner with respect thereto, and a second hydraulic axial piston member accommodated in the housing while being supported by the second rotational shaft in a relatively non-rotatable manner with respect thereto, wherein the first hydraulic axial piston member includes a cylinder block that is supported by the first rotational shaft in a non-rotatable manner with respect thereto and has a plurality of cylinder holes disposed around the axial line of the first rotational shaft, and a plurality of pistons that are accommodated in the plurality of cylinder holes in a reciprocating manner, the free ends of the plurality of pistons being engaged with a first-hydraulic-axial-piston-device swash plate, which is provided in the axial piston device, so as to define a volume of the first hydraulic axial piston member, wherein the housing is provided with a drain port for discharging the retained oil to the outside and a supply oil passage for guiding lubricating oil, which has been supplied from an oil source, toward the first hydraulic axial piston member, wherein the drain port is arranged so as to bring about such a retained-oil level that the second hydraulic axial piston member is partially or entirely immersed in the retained oil while the first hydraulic axial piston member is not immersed in the retained oil wherein the supply oil passage includes a receiving oil hole that has a first end opening to the external surface of the first rotational shaft so as to receive the lubricating oil supplied from the oil source, an axial oil hole that is fluidly connected to the receiving oil hole and extends in the axial line, and a first lubricating oil hole that has a first end fluidly connected to the axial oil hole and a second end opening to the external surface of the first rotational shaft at a space disposed between the cylinder block and a spring receiving member, and wherein the space opens toward the engagement portion between the free ends of the plurality of pistons and the swash plate.

2. An axial piston device according to claim 1,
wherein the housing includes a housing body provided with an opening into which the first and second hydraulic axial piston members can be inserted and a port block removably connected to the housing body so as to block the opening,
wherein the housing body includes a peripheral wall that extends in the axial line of the second rotational shaft and defines the opening on a first end side in the axial line of the second rotational shaft, and an end wall that closes the peripheral wall on a second end side in the axial line of the second rotational shaft and supports the second rotational shaft in a rotatable manner around the axial line by working together with the port block, and
wherein the drain port is arranged in the end wall so as to overlap the second hydraulic axial piston member as viewed from the front along the second rotational shaft.

3. An axial piston device according to claim 2,
wherein the first rotational shaft functions as a pump shaft that is operatively connected to a driving source, and the second rotational shaft functions as a motor shaft that outputs rotative power,
wherein the first hydraulic axial piston member functioning as a hydraulic pump and the second hydraulic axial piston member functioning as a hydraulic motor, at least one of which is a variable-volume type, are fluidly connected by a pair of hydraulic oil lines so as to form a closed circuit, and
wherein the supply oil passage receives, as the lubricating oil, a part of oil in a charge line for replenishing the pair of hydraulic oil lines with hydraulic oil.

4. An axial piston device according to claim 3,
wherein the port block is formed with a charge oil passage having a first end fluidly connected to the oil source and a second end fluidly connected to the pair of hydraulic oil lines via a pair of check valves, and
wherein the supply oil passage has a first end side that is fluidly connected to the charge oil passage on the more upstream side in the charge oil flow direction than the pair of check valves are, and a second end side that opens toward the first axial piston member.

5. An axial piston device according claim 4,
wherein the supply oil passage includes a port-block-side supply oil passage formed in the port block, a housing-body-side supply oil passage formed in the housing body, and a rotational-shaft-side supply oil passage formed in the first rotational shaft,
wherein the port-block-side supply oil passage has a first end that is fluidly connected to the charge oil passage on the more upstream side in the charge oil flow direction than the pair of check valves are, and a second end that opens to a portion of the port block that is in contact with the peripheral wall of the housing body,
wherein the housing-body-side supply oil passage has a first end that opens to a portion of the housing body that is in contact with the port block so as to be fluidly connected to the second end of the port-block-side supply oil passage, and a second end that opens to a portion of the end wall where the first rotational shaft is in slide-contact with the end wall.

6. An axial piston device according claim 5,
wherein the supply oil passage further includes a second lubricating oil hole that has a first end fluidly connected to the axial oil hole and a second end opening toward a bearing member attached to the port block for supporting a first end side in the axial line of the first rotational shaft in a rotatable manner around the axial line, and a third lubricating oil hole that has a first end fluidly connected to the housing-body-side supply oil passage or the rotational-shaft-side supply oil passage and a second end opening toward a bearing member attached to the end wall for supporting a second end side in the axial line of the first rotational shaft in a rotatable manner around the axial line.

7. An axial piston device according claim 6,
wherein the swash plate includes a base body supported by the peripheral wall so as to be rotatable around a swinging axis perpendicular to the first rotational shaft, and a swash plate body supported by the base body and directly or indirectly engaged with the free ends of the plurality of pistons, and
wherein the supply oil passage includes a fourth lubricating oil hole that has a first end fluidly connected to the housing-body-side supply oil passage and a second end opening to a supporting hole formed in the peripheral wall for supporting the base body.

8. An axial piston device according claim 5,
wherein the swash plate includes a base body supported by the peripheral wall so as to be rotatable around a swinging axis perpendicular to the first rotational shaft, and a swash plate body supported by the base body and directly or indirectly engaged with the free ends of the plurality of pistons, and
wherein the supply oil passage includes a fourth lubricating oil hole that has a first end fluidly connected to the housing-body-side supply oil passage and a second end opening to a supporting hole formed in the peripheral wall for supporting the base body.

9. An axial piston device according to claim 1,
wherein the housing includes a housing body provided with an opening into which the first and second hydraulic axial piston members can be inserted and a port block removably connected to the housing body so as to block the opening,
wherein the housing body includes a peripheral wall that extends in the axial line of the second rotational shaft and defines the opening on a first end side in the axial line of the second rotational shaft, and an end wall that closes the peripheral wall on a second end side in the axial line of the second rotational shaft and supports the second rotational shaft in a rotatable manner around the axial line by working together with the port block, and
wherein the drain port is arranged in the peripheral wall so as to overlap the second hydraulic axial piston member as viewed from the side perpendicular to the second rotational shaft.

10. An axial piston device according to claim 9,
wherein the first rotational shaft functions as a pump shaft that is operatively connected to a driving source, and the second rotational shaft functions as a motor shaft that outputs rotative power,
wherein the first hydraulic axial piston member functioning as a hydraulic pump and the second hydraulic axial piston member functioning as a hydraulic motor, at least one of which is a variable-volume type, are fluidly connected by a pair of hydraulic oil lines so as to form a closed circuit, and
wherein the supply oil passage receives, as the lubricating oil, a part of oil in a charge line for replenishing the pair of hydraulic oil lines with hydraulic oil.

* * * * *